(12) United States Patent
Turunen et al.

(10) Patent No.: US 8,804,589 B2
(45) Date of Patent: Aug. 12, 2014

(54) ADAPTIVE AWAKE WINDOW

(75) Inventors: Markku Tapio Turunen, Helsinki (FI); Kari J. Leppänen, Helsinki (FI); Philip Ginzboorg, Espoo (FI); Enrico-Henrik Rantala, Iittala (FI)

(73) Assignee: Nokia Corporation, Espoo (FI)

( * ) Notice: Subject to any disclaimer, the term of this patent is extended or adjusted under 35 U.S.C. 154(b) by 259 days.

(21) Appl. No.: 13/273,921

(22) Filed: Oct. 14, 2011

(65) Prior Publication Data

US 2013/0094413 A1 Apr. 18, 2013

(51) Int. Cl.
*H04B 1/38* (2006.01)

(52) U.S. Cl.
USPC ............ 370/311; 370/310; 370/312; 370/342

(58) Field of Classification Search
USPC .......... 370/311, 345, 338, 390, 392; 455/574, 455/13.4, 522, 127.5, 343.1, 343.5
See application file for complete search history.

(56) References Cited

U.S. PATENT DOCUMENTS

| | | | |
|---|---|---|---|
| 5,371,734 A | 12/1994 | Fischer | |
| 6,941,372 B2 | 9/2005 | Pearson | |
| 7,567,673 B2 | 7/2009 | Fukuzawa et al. | |
| 7,590,100 B2 | 9/2009 | Smith et al. | |
| 7,774,495 B2 | 8/2010 | Pabla et al. | |
| 7,840,903 B1 | 11/2010 | Amidon et al. | |
| 7,848,277 B2 | 12/2010 | Chou et al. | |
| 7,864,720 B2 | 1/2011 | Jeyaseelan | |
| 7,907,557 B2 | 3/2011 | Carter | |
| 8,005,032 B2 | 8/2011 | Wang et al. | |
| 8,005,515 B1 * | 8/2011 | Chhabra et al. ............... 455/574 |
| 8,014,378 B1 | 9/2011 | Yoon et al. | |
| 8,165,106 B2 | 4/2012 | Yang et al. | |
| 8,185,726 B2 * | 5/2012 | Taha et al. ........................ 713/1 |
| 2002/0101446 A1 | 8/2002 | Tang et al. | |

(Continued)

FOREIGN PATENT DOCUMENTS

| | | |
|---|---|---|
| CN | 1571283 | 1/2005 |
| CN | 1728668 | 2/2006 |

(Continued)

OTHER PUBLICATIONS

International Search Report for International Application No. PCT/FI2010/050069—Date of Completion of Search: Jun. 4, 2010—4 pages.

(Continued)

*Primary Examiner* — Dang Ton
*Assistant Examiner* — Sai Aung
(74) *Attorney, Agent, or Firm* — Locke Lord LLP

(57) ABSTRACT

A system for facilitating communal apparatus interaction. In accordance with at least one embodiment of the present invention, an apparatus configured to communicate on a wireless channel may receive first information pertaining to wireless traffic expected from other networks also utilizing the wireless channel. The apparatus may then determine whether the received information satisfies a first criterion, and if it is determined that the first information satisfies the first criterion, the apparatus may shorten an awake window duration for communicating on the wireless channel. Alternatively, if it is determined that the information does not satisfy the first criterion, the apparatus may proceed to further determine whether second information pertaining to wireless traffic on the wireless channel that is expected from a network satisfies a second criterion. If it is determined that the second information satisfies the second criterion, the apparatus may proceed to lengthen the awake window duration.

13 Claims, 14 Drawing Sheets

(56) References Cited

U.S. PATENT DOCUMENTS

| | | |
|---|---|---|
| 2003/0204742 A1 | 10/2003 | Gupta et al. |
| 2004/0153676 A1 | 8/2004 | Krantz et al. |
| 2005/0025092 A1 | 2/2005 | Morioka et al. |
| 2005/0068928 A1 | 3/2005 | Smith et al. |
| 2005/0128988 A1 | 6/2005 | Simpson et al. |
| 2005/0193106 A1 | 9/2005 | Desai et al. |
| 2006/0034217 A1 | 2/2006 | Kwon et al. |
| 2006/0050730 A1 | 3/2006 | Shvodian |
| 2006/0120314 A1 | 6/2006 | Krantz et al. |
| 2006/0215588 A1 | 9/2006 | Yoon |
| 2006/0251004 A1 | 11/2006 | Zhong et al. |
| 2006/0285510 A1 | 12/2006 | Kim et al. |
| 2007/0002866 A1 | 1/2007 | Belstner et al. |
| 2007/0086424 A1 | 4/2007 | Calcev et al. |
| 2007/0086426 A1 | 4/2007 | Bonta et al. |
| 2007/0127427 A1 | 6/2007 | Tanaka |
| 2007/0161364 A1 | 7/2007 | Surineni et al. |
| 2007/0226777 A1 | 9/2007 | Burton et al. |
| 2007/0249291 A1* | 10/2007 | Nanda et al. ............... 455/73 |
| 2007/0254596 A1 | 11/2007 | Corson et al. |
| 2007/0297438 A1* | 12/2007 | Meylan et al. ............. 370/445 |
| 2008/0002692 A1* | 1/2008 | Meylan et al. ............. 370/390 |
| 2008/0025512 A1 | 1/2008 | Nakajima |
| 2008/0031208 A1 | 2/2008 | Abhishek et al. |
| 2008/0095091 A1* | 4/2008 | Surineni et al. ............ 370/311 |
| 2008/0125190 A1 | 5/2008 | Jan et al. |
| 2008/0130543 A1 | 6/2008 | Singh et al. |
| 2008/0151848 A1 | 6/2008 | Fischer et al. |
| 2008/0261639 A1 | 10/2008 | Sun et al. |
| 2008/0268892 A1 | 10/2008 | Hamdi et al. |
| 2009/0073871 A1 | 3/2009 | Ko et al. |
| 2009/0147702 A1 | 6/2009 | Buddhikot et al. |
| 2009/0156190 A1 | 6/2009 | Fisher |
| 2009/0196180 A1 | 8/2009 | Bahl et al. |
| 2009/0247201 A1 | 10/2009 | Ye et al. |
| 2009/0279449 A1 | 11/2009 | Kneckt et al. |
| 2009/0303926 A1 | 12/2009 | Den Hartog et al. |
| 2009/0310571 A1 | 12/2009 | Matischek et al. |
| 2009/0310618 A1 | 12/2009 | Carter |
| 2009/0325533 A1* | 12/2009 | Lele et al. ............. 455/343.1 |
| 2010/0002584 A1* | 1/2010 | Jalali ............................ 370/235 |
| 2010/0002608 A1 | 1/2010 | Goldhamer |
| 2010/0110948 A1 | 5/2010 | Batta |
| 2010/0111066 A1 | 5/2010 | Mehta |
| 2010/0138549 A1 | 6/2010 | Goel et al. |
| 2010/0142463 A1 | 6/2010 | Hu |
| 2010/0157827 A1 | 6/2010 | Park et al. |
| 2010/0165947 A1 | 7/2010 | Taniuchi et al. |
| 2010/0189082 A1 | 7/2010 | Choi et al. |
| 2010/0226297 A1 | 9/2010 | Kasslin et al. |
| 2010/0226309 A1 | 9/2010 | Kasslin et al. |
| 2010/0246591 A1 | 9/2010 | Gobriel et al. |
| 2010/0302947 A1 | 12/2010 | Leppanen et al. |
| 2010/0304759 A1 | 12/2010 | Leppanen et al. |
| 2010/0332683 A1 | 12/2010 | Das et al. |
| 2011/0038349 A1 | 2/2011 | Sun et al. |
| 2011/0058510 A1* | 3/2011 | Thomas et al. ............. 370/311 |
| 2011/0065440 A1 | 3/2011 | Kakani |
| 2011/0069649 A1* | 3/2011 | Gobriel et al. ............. 370/311 |
| 2011/0141966 A1 | 6/2011 | Kasslin et al. |
| 2011/0142028 A1 | 6/2011 | Kasslin et al. |
| 2011/0142029 A1 | 6/2011 | Kasslin et al. |
| 2011/0222493 A1 | 9/2011 | Mangold et al. |
| 2011/0250857 A1 | 10/2011 | Reial et al. |
| 2011/0250921 A1 | 10/2011 | Reial |
| 2012/0077506 A1 | 3/2012 | Wietfeldt et al. |
| 2012/0207040 A1* | 8/2012 | Comsa et al. ............... 370/252 |
| 2012/0225662 A1 | 9/2012 | Jo et al. |
| 2013/0170420 A1* | 7/2013 | Kobayashi ................... 370/311 |

FOREIGN PATENT DOCUMENTS

| | | |
|---|---|---|
| CN | 101601229 | 12/2009 |
| EP | 1361728 | 11/2003 |
| EP | 1396986 | 3/2004 |
| EP | 1545146 | 6/2005 |
| EP | 1703701 | 9/2006 |
| EP | 2107732 | 10/2009 |
| WO | WO2004091246 | 10/2004 |
| WO | WO2005006658 | 1/2005 |
| WO | WO2008019140 | 2/2008 |
| WO | WO2008075264 | 6/2008 |
| WO | WO2008094107 | 8/2008 |
| WO | WO2009113798 | 9/2009 |
| WO | W02009135996 | 11/2009 |
| WO | WO2010029386 | 3/2010 |

OTHER PUBLICATIONS

International Search Report for International Application No. PCT/FI2010/050838—Date of Completion of Search: Jan. 21, 2011, 4 pages.

Chen, H. et al., IEEE P802.11; doc.:IEEE 802.11-10/0828r0, Wireless LANs, Normative Text for 5 MHz Measurement Pilot Frame, Jun. 2010, 4 pages.

Wang, L. et al., Proposed SFD Text for 802.11ai, doc.:IEEE 11-12-0406-02-00ai; Passive Scanning Improvement, May 4, 2012; 15 pages.

Extended European Search Report for European App. No. 12183977.3—Date of Completion of Search: Jun. 12, 2013, 6 pages.

Cavalcanti, D. et al., "IEEE 802.22-07/0121r1: Proposed text changes to Section 6.21.2 Self-coexistence in IEEE 802.22/D0.2 Draft Standard" published in Mar. 2007, 26 pages.

Cordeiro, C. et al, "Cognitive PHY and MAC Layers for Dynamic Spectrum Access and Sharing of TV Bands", published by ACM on Aug. 5, 2006, 11 pages.

IEEE 802.11-2007, Wireless Medium Access Control (MAC) and Physical Layer (PHY) Specifications, Jun. 2007, Chapter 7.2.3.1. entitled "Beacon frame format", (pp. 80-81).

International Search Report of International App. No. PCT/FI2010/050071—Date of Completion of Search: May 3, 2010, 4 pages.

International Search Report of International App. No. PCT/FI2010/050801—Date of Completion of Search: Feb. 3, 2011, 4 pages.

International Search Report of International App. No. PCT/FI2010/050803—Date of Completion of Search: Feb. 24, 2011, 4 pages.

International Search Report of International App. No. PCT/FI2010/050838—Date of Completion of Search: Jan. 21, 2011, 4 pages.

Wang, Q., et al., "AwareWare: An Adaptation Middleware for Heterogeneous Environments", IEEE Communications Society, 2004, 6 pages.

International Search Report for International Application No. PCT/IB2010/052403—Date of Completion of Search: Sep. 8, 2010—4 pages.

X. Gao, et al; Optimal ATIM size for 802.11 networks in ad hoc mode; DoCoMo Communications Lab USA, Mar. 27, 2006.

Eun-Sun Jung, et al; An Energy Efficient MAC Protocol for Wireless LANs; Technical Report TR01-017; Dept of Computer Science; Texas A&M University; Jul. 31, 2001; pp. 1-11.

Wi-Fi Alliance Technical Committee; Quality of Service (QoS) Task Group; WMM TM (including WMM TM Power Save) Specification; Wi-Fi Alliance, V. 1.1; WMM_Specification_1-1.doc; pp. 1-36, Jun. 2004.

English Language Machine Translation of Chinese Application Publication No. CN1571283, 9 pages.

English Language Machine Translation of Chinese Application Publication No. CN101601229, 10 pages.

English Language Machine Translation of Chinese Application Publication No. CN1728668, 11 pages.

\* cited by examiner

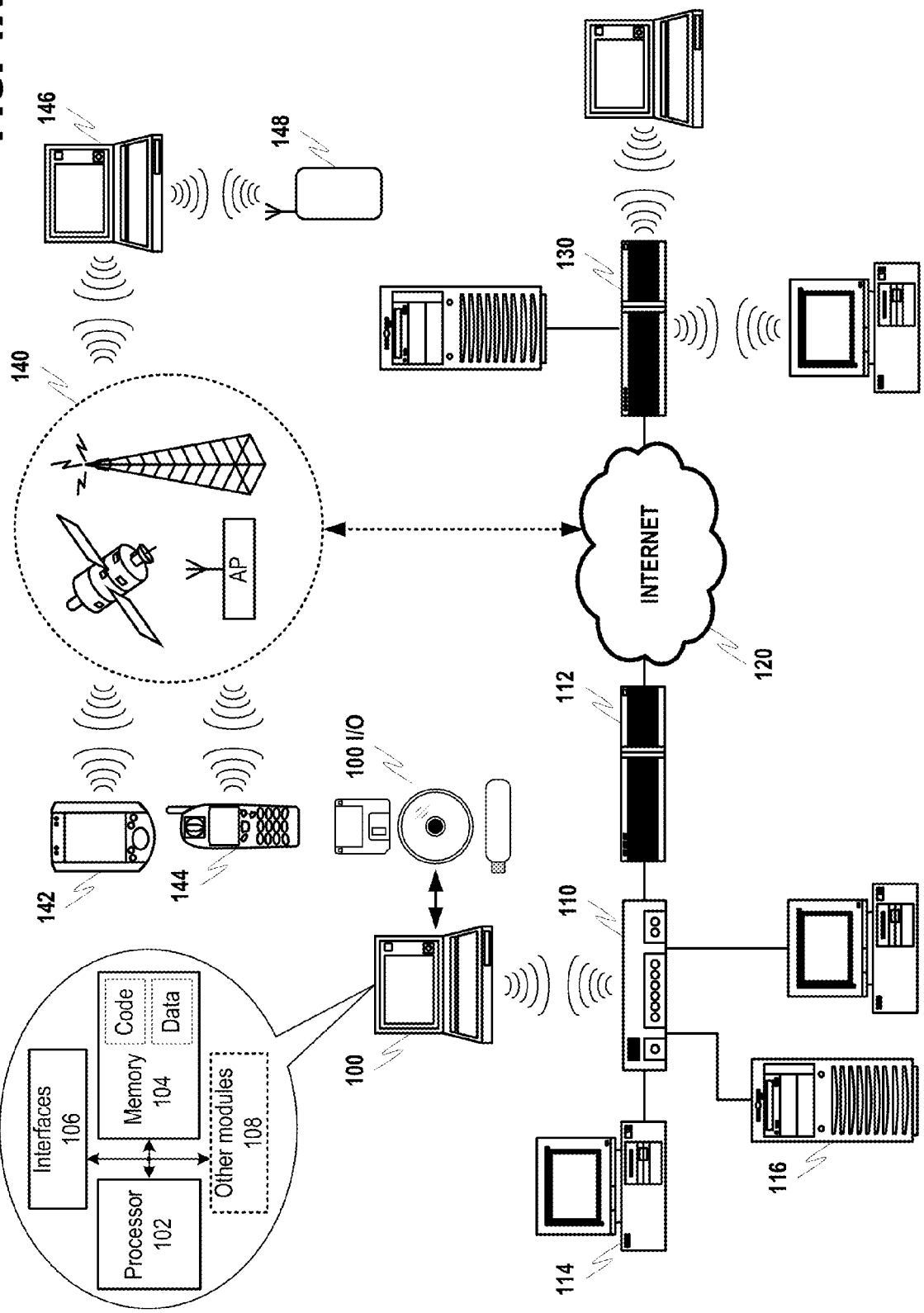

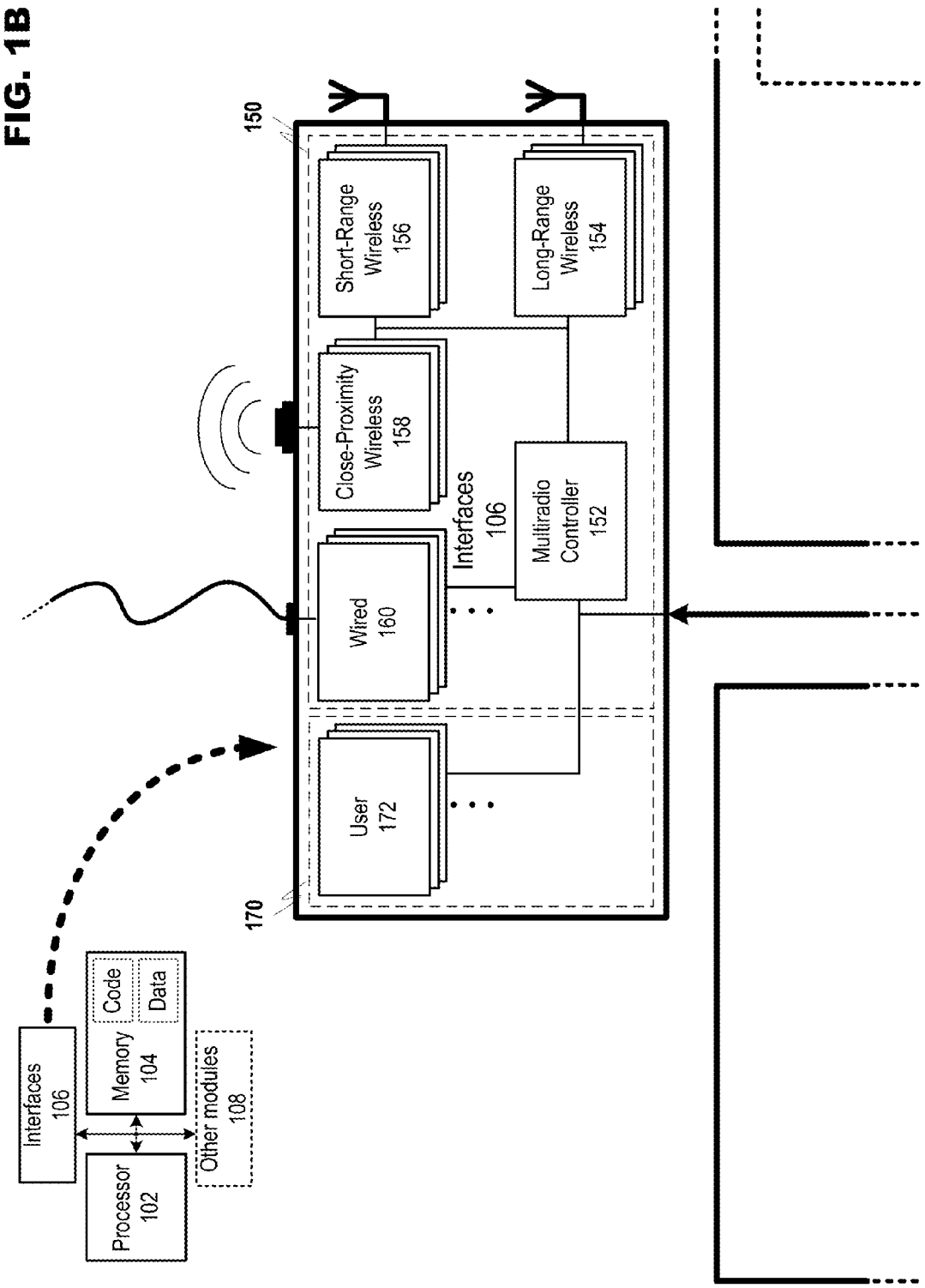

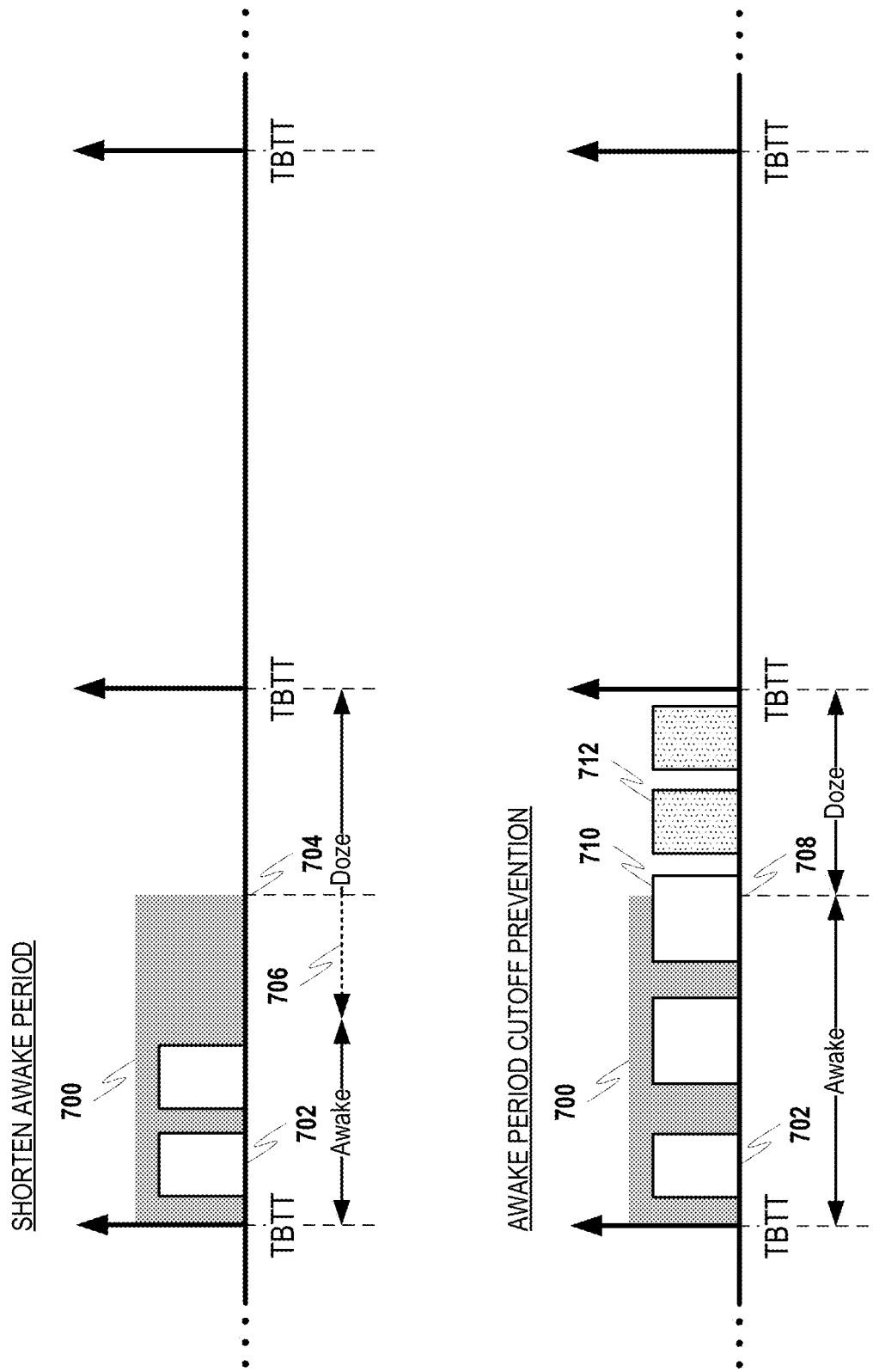

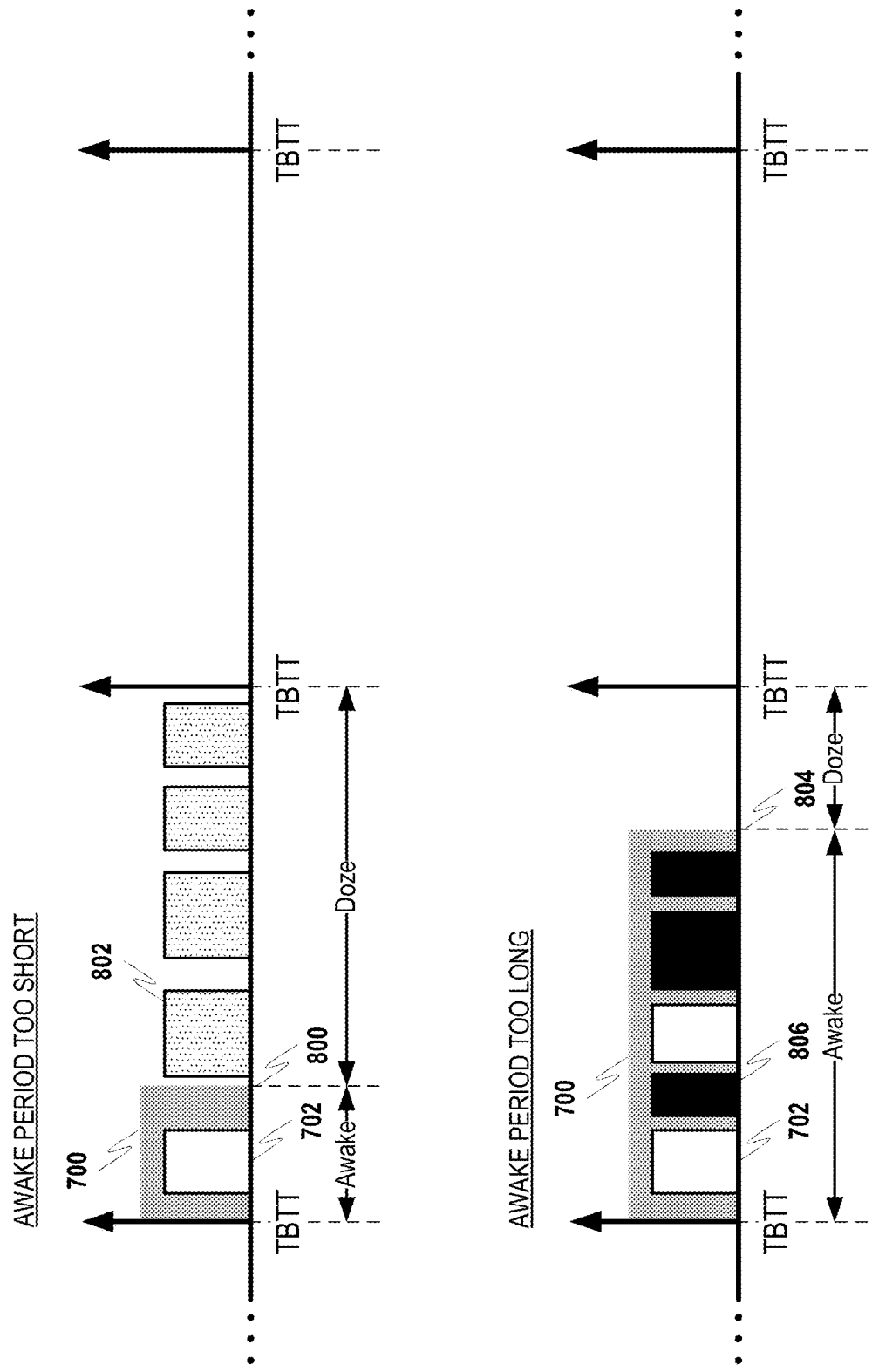

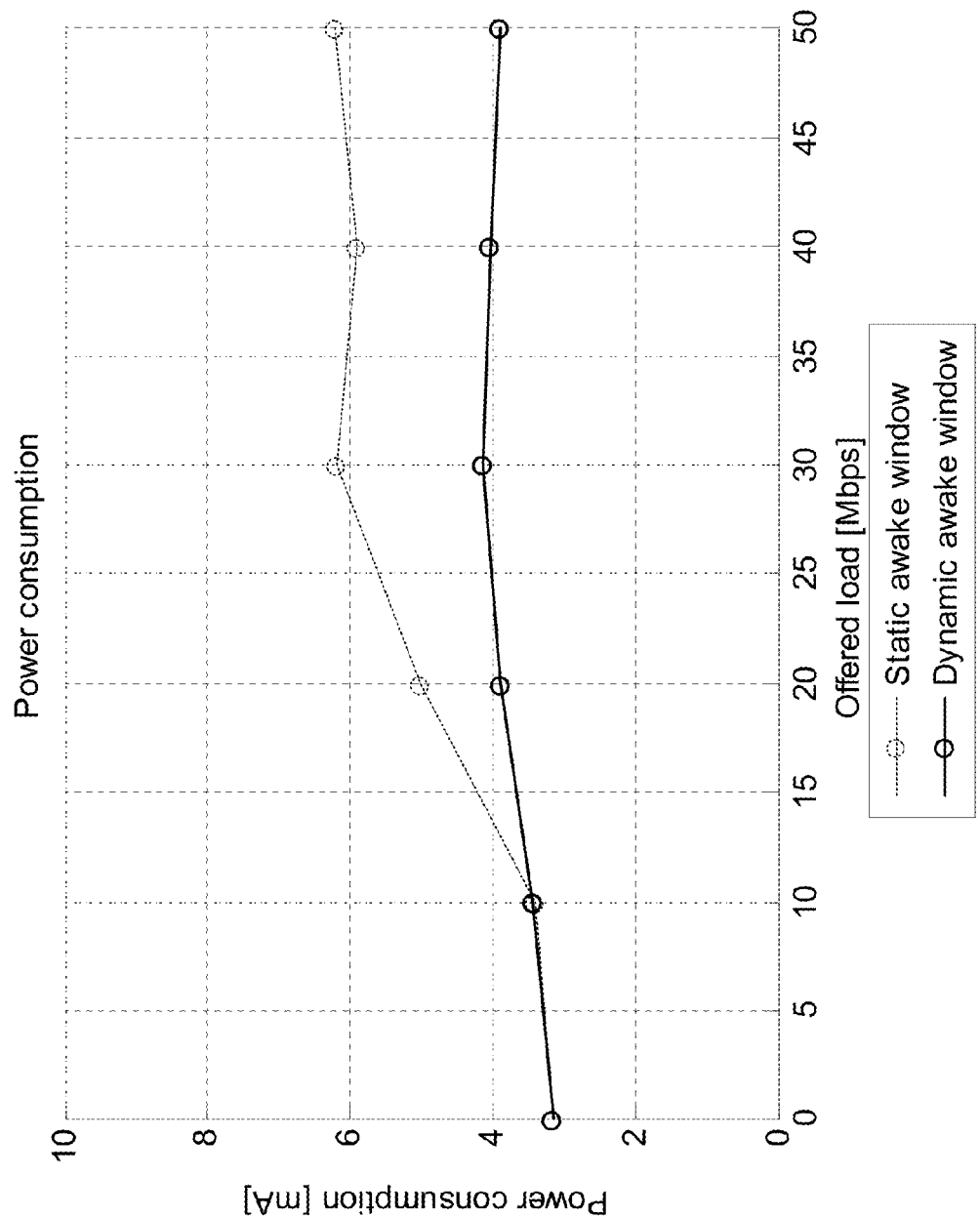

ADAPTIVE AWAKE WINDOW

BACKGROUND

1. Field of Invention

Embodiments of the present invention pertain to wireless communication, and in particular, to enabling the wireless conveyance of communal information between apparatuses.

2. Background

Wireless technology has evolved from a simple carrier for voice communication to being employed in various wireless applications. Enhancements in wireless technology have substantially improved communication abilities, quality of service (QoS), speed, etc., which have contributed to insatiable user desire for new device functionality. As a result, portable wireless apparatuses are no longer just relied on for making telephone calls. They have become integral, and in some cases essential, tools for managing the professional and/or personal lives of users.

For example, as manufacturers release mobile devices having new communication abilities, there is now an expectation amongst users that applications residing on the devices have a real time "awareness" of both local and remote information. In supporting such functionality, applications not traditionally incorporating communication functionality are being redesigned to support wired/wireless communication. In one example usage scenario, wireless support may enable monitoring (e.g., sensor) apparatuses to transmit data to other apparatuses via wireless communication. Example usage scenarios may include natural resource monitoring, biometric sensors, systems for supporting financial transactions, personal communication and/or location devices, etc. Apparatuses enabled for such monitoring/communication activities may operate using limited resources. For example, these apparatuses may be simple (e.g., may have limited processing resources), may be small (e.g., may have space constraints due to size limitations imposed in retrofit applications), may have power constraints (e.g., battery powered), etc.

Wireless connection establishment and maintenance processes defined in existing communication protocols may not be appropriate for all apparatuses, such as those with resource constraints as described above. For example, existing wireless communication protocols may require substantial wireless interaction to keep apparatuses synchronized with other apparatuses in the network, wherein such interaction may comprise either continuous or periodic network participation. These requirements may not take into consideration the burden that such extensive network communication places upon resource-constrained devices, especially when other wireless traffic could possibly cause interference in the same operational space (e.g., other wireless networks operating utilizing the same wireless channel). As a result, it may become difficult to operate such resource-constrained apparatuses in accordance with these standards.

SUMMARY

Example embodiments of the present invention may be directed to a method, apparatus, computer program and system for facilitating communal apparatus interaction. In accordance with at least one embodiment of the present invention, an apparatus configured to communicate on a wireless channel may receive first information pertaining to wireless traffic expected from other networks also utilizing the wireless channel. The apparatus may then determine whether the received information satisfies a first criterion, and if it is determined that the first information satisfies the first criterion, the apparatus may shorten an "awake" window duration for communicating on the wireless channel. Alternatively, if it is determined that the information does not satisfy the first criterion, the apparatus may proceed to further determine whether second information pertaining to wireless traffic on the wireless channel that is expected from a network satisfies a second criterion. If it is determined that the second information satisfies the second criterion, the apparatus may proceed to lengthen the awake window duration.

In an example implementation the first criterion may be set in the apparatus as a dominance threshold value for the other networks also utilizing the wireless channel, while the second criterion may be set in the apparatus as a dominance threshold value for the network in which the apparatus is participating. In this example determining whether the first information satisfies the first criterion may comprise the apparatus determining whether the wireless traffic expected from the other networks also utilizing the wireless channel exceeds the other network dominance threshold. Likewise, the apparatus determining whether the second information satisfies the second criteria may comprise the apparatus determining whether the wireless traffic on the wireless channel expected from the network in which the apparatus is operating exceeds the dominance threshold value for the network in which the apparatus is participating.

It is also possible for the first and second criteria to correspond to previous values for the first and second information, respectively. In such an instance determining whether the first information satisfies the first criterion may comprise the apparatus determining whether the wireless traffic expected form the other networks also utilizing the wireless channel exceeds the previous wireless traffic expected from the other wireless networks also utilizing the wireless channel, while determining whether the second information satisfies the second criterion may comprise the apparatus determining whether the wireless traffic expected from the network in which the apparatus is participating exceeds the previous wireless traffic expected from the network in which the apparatus is operating. Regardless of how the first and second criteria are established, the results of these determinations may cause the apparatus to shorten or lengthen the awake window, which may correspond to a period of time during which the apparatus is allowed to transmit and receive on the wireless channel. However, there are exceptions to the above situations. For example, in the instance that a determination is made that the second information does not satisfy the second criterion, the apparatus may maintain (e.g., not shorten or lengthen) the duration of the awake window for communicating on the wireless channel.

The above summarized configurations or operations of various embodiments of the present invention have been provided merely for the sake of explanation, and therefore, are not intended to be limiting. Moreover, inventive elements associated herein with a particular example embodiment of the present invention can be used interchangeably with other example embodiments depending, for example, on the manner in which an embodiment is implemented.

DESCRIPTION OF DRAWINGS

The disclosure will be further understood from the following description of various exemplary embodiments, taken in conjunction with appended drawings, in which:

FIG. 1A discloses example apparatuses, systems, configurations, etc. that may be utilized when implementing the various embodiments of the present invention FIG. 1B discloses further detail regarding an example apparatus configuration that may be utilized when implementing the various embodiments of the present invention.

FIG. 7 discloses example awake period duration control in accordance with at least one example embodiment of the present invention.

FIG. 8 discloses further examples of awake period duration control in accordance with at least one example embodiment of the present invention.

FIG. 9C discloses a third example simulation of performance that may be realized in accordance with at least one example embodiment of the present invention.

DESCRIPTION OF EXEMPLARY EMBODIMENTS

Figure 2:
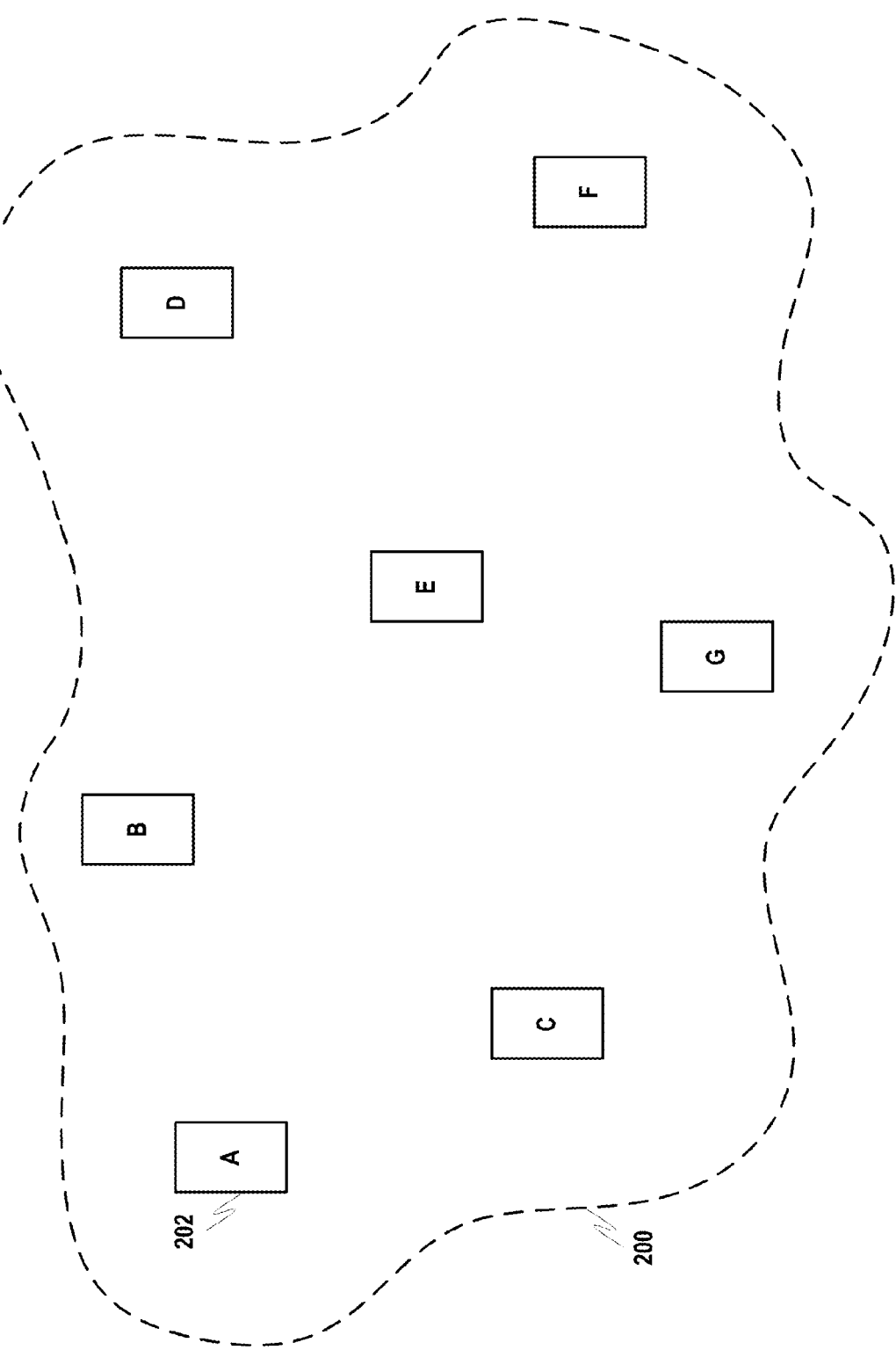
FIG. 2 discloses an example operational space comprising a plurality of apparatuses in accordance with at least one embodiment of the present invention.

While the present invention has been described herein in terms of a multitude of example embodiments, various changes or alterations can be made therein without departing from the spirit and scope of the present invention, as set forth in the appended claims.

I. Example System with which Embodiments of the Present Invention May be Implemented An example of a system that is usable for implementing various embodiments of the present invention is disclosed in FIG. 1A. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or imbedded memories (e.g., non-transitory computer readable storage media) that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.). Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1A. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, some or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Further detail regarding example interface component 106 disclosed with respect to computing device 100 in FIG. 1A is now discussed regarding FIG. 1B. As previously set forth, interfaces 106 may include interfaces both for communicating data to computing apparatus 100 (e.g., as identified at 150) and other types of interfaces 170 including, for example, user interface 172. A representative group of apparatus-level interfaces is disclosed at 150. For example, multiradio controller 152 may manage the interoperation of long range wireless interfaces 154 (e.g., cellular voice and data networks), short-range wireless interfaces 156 (e.g., Bluetooth and WLAN networks), close-proximity wireless interfaces 158 (e.g., for interactions where electronic, magnetic, electromagnetic and optical information scanners interpret machine-readable data), wired interfaces 160 (e.g., Ethernet), etc. The example interfaces shown in FIG. 1B have been presented only for the sake of explanation herein, and thus, are not intended to limit the various embodiments of the present invention to utilization of any particular interface. Embodiments of the present invention may also utilize interfaces that are not specifically identified in FIG. 1B.

Multiradio controller 152 may manage the operation of some or all of interfaces 154-160. For example, multiradio controller 152 may prevent interfaces that could interfere with each other from operating at the same time by allocating specific time periods during which each interface is permitted to operate. Further, multiradio controller 152 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 152 may interact with interfaces 154-160 in FIG. 1B.

II. Example Operational Environment

FIG. 2 discloses an example operational space 200 that will be used to explain the various example embodiments of the present invention. As this example scenario is utilized herein only for the sake of explanation, implementations of the present invention are not limited specifically to the disclosed example. Operational spaces may be defined using different criteria. For example, physical areas like buildings, theatres, sports arenas, etc. may define a space where users may interact. Alternatively, operational spaces may be defined in terms of apparatuses that utilize particular wireless transports, apparatuses that are within communication range (e.g., a certain distance) of each other, apparatuses that are members of certain classes or groups, etc.

Wireless-enabled apparatuses 202 are labeled "A" to "G" in FIG. 2. Apparatuses 202 may, for example, correspond to any of the wireless-enabled apparatuses that were disclosed in FIG. 1A, and may further comprise at least the hardware and/or software resources disclosed in regard to apparatus 100 in FIG. 1B. These apparatuses may further operate utilizing at least one common wireless communication protocol. That is, all of the apparatuses shown in FIG. 3 may interact wirelessly within operational space 200 (e.g., as members of wireless networks).

Figure 3:
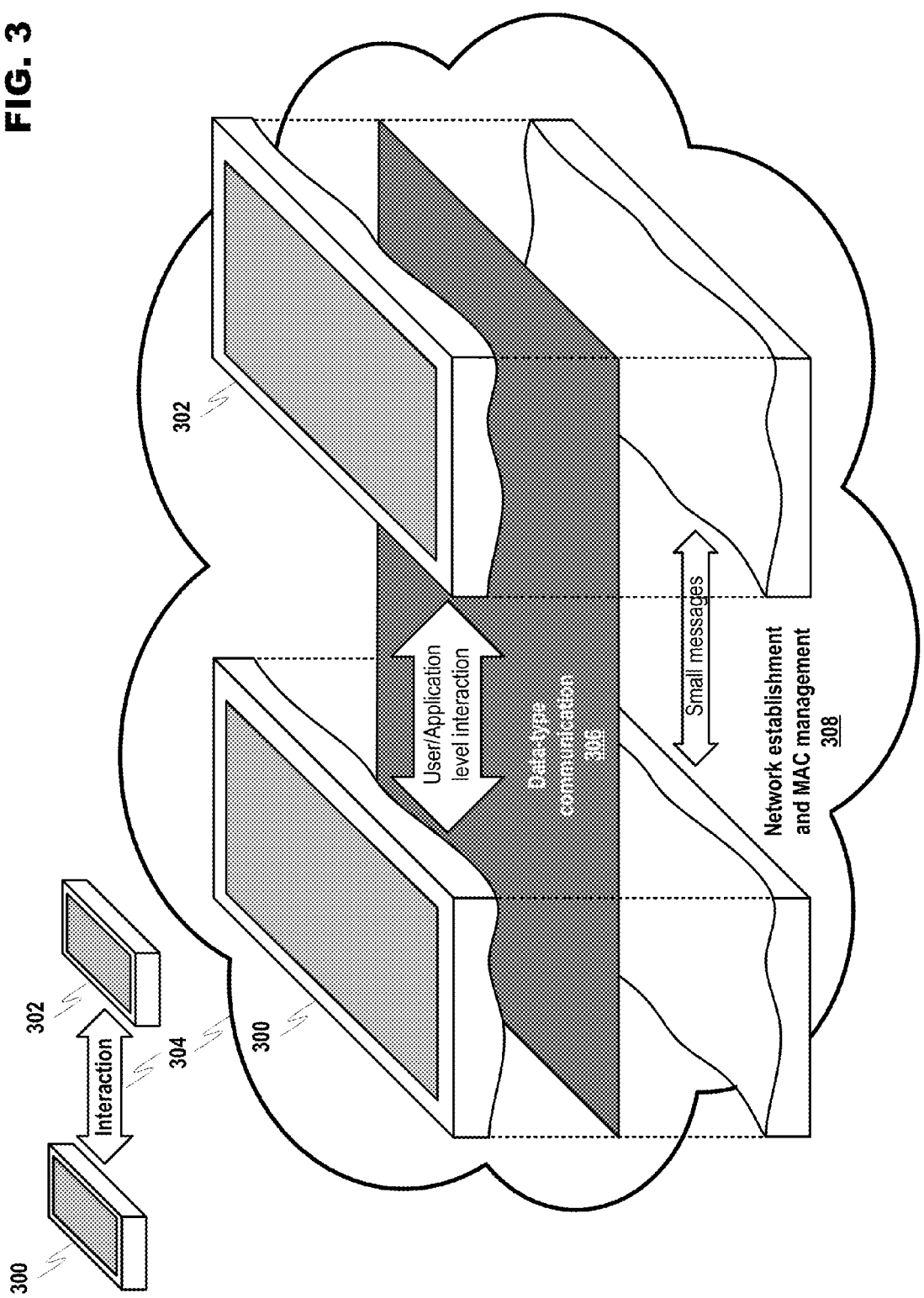
FIG. 3 discloses examples of messaging that may occur in accordance with at least one example embodiment of the present invention.

An example interaction between two apparatuses 300 and 302, in accordance with at least one embodiment of the present invention, is disclosed at 304 in FIG. 3. Example interaction 304 has been presented herein for explanation only. The various embodiments of the present invention may accommodate wireless interaction between more than two apparatuses.

Detail with respect to example interaction 304 is disclosed further in the "cloud" also depicted at 304 in FIG. 3. Initially, the apparatuses may have "upper-level" communication requirements that may comprise, for example, interactions by apparatus users and/or applications residing on the apparatuses that may trigger the transmission of messages that may be generally classified under the category of data-type communication 306. Data-type communication may be carried out via messages that may be wirelessly transmitted between apparatuses 300 and 302.

However, typically a formal wireless network connection needs to be established before any data-type communication messages 306 may be exchanged. Network establishment and media access control (MAC) management messages 308 may be utilized to establish and maintain an underlying wireless network architecture within operating space 200 that may be utilized to convey data-type communication messages 306. In accordance with at least one embodiment of the present invention, small messages (e.g., having a mean size of 100 Bytes) containing apparatus configuration, operation and status information may be exchanged to transparently establish wireless network connections when, for example, an apparatus enters operating space 200. Network connections may exist between any/all apparatuses existing within the operating space, and may exist for the entire time that apparatuses reside in operating space 200. Data-type communication messages 406 may then be conveyed using existing networks (new network connections do not need to be negotiated each time messages are sent), which may reduce response delay and increase quality of service (QoS).

Figure 4:
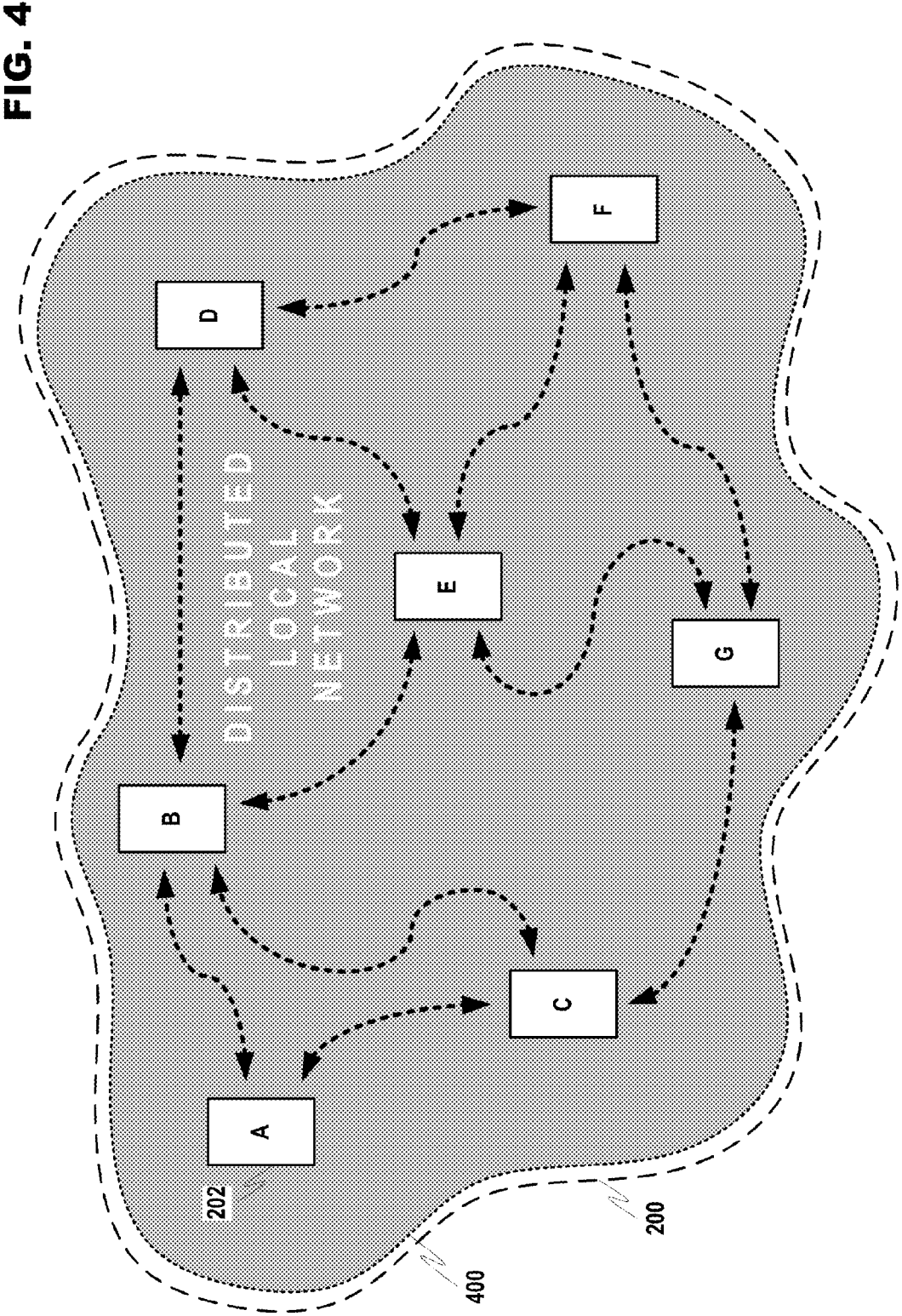
FIG. 4 discloses an example of inter-apparatus message propagation in accordance with at least one example embodiment of the present invention.

In accordance with at least one embodiment of the present invention, the above maintenance of connectivity utilizing small messages, such as network establishment and MAC management messages 308, may be considered as also maintaining apparatus awareness within operating space 200 as disclosed in FIGS. 2 and 4. For example, small messages may be utilized to exchange not only apparatus-related information, but any information stored on an apparatus, such as apparatus user information, information about the physical location of an apparatus, etc. This information may be referred to herein as "communal" information in that it relates to the operations of any of or all of the members of the "community" within distributed network 400.

An example of distributed local network formation 400 via automated network establishment and MAC management messages 308 is disclosed in FIG. 4. Apparatuses 202 entering into operational space 200 may immediately begin exchanging communal information (e.g., via small messages). The exchange of this information may occur without any prompting from, or even knowledge of, a user. Example interactivity is shown in FIG. 4, wherein various network establishment and MAC management messages 308 are exchanged between apparatuses A to G. In accordance with at least one embodiment of the present invention, messages may be exchanged directly between an originating apparatus (e.g., the apparatus that is described by information elements contained in a message) and a receiving apparatus. Alternatively, messages transmitted within network 400 may be forwarded from one apparatus 202 to another, thereby disseminating the information for multiple apparatuses 202.

The possible benefits resulting from the ability to transparently convey small messages within network 400 are apparent in that apparatuses 202 may be able to maintain real-time awareness of communal information (e.g., apparatuses, people, places objects, etc.) without having to manually orchestrate data collection. However, the time and resources required to configure the Internet Protocol (IP) cannot be afforded in such operations. For example, the subnetwork access protocol (SNAP) in the IEEE 802.2 logical link control (LLC) is an existing tool that may be usable for conveying communal information. However, SNAP would be overkill for such small message interactions in that SNAP incurs substantial protocol overhead to accommodate different types of network-level protocols. The communication of communal information does not require SNAP or even IP. Communal information may comprise small messages that may be transferred without network layer protocol support. The small messages may comprise, for example, at least one of community identifier information, person identifier information, place description information and service description information. Apparatuses need to be able to convey small messages as soon as they enter the communal environment (e.g., operating space 200), and thus, there needs to be a way to avoid using IP when exchanging communal information (e.g., via small messages), even when Wi-Fi technology is being employed. Instead, the distribution of communal information via small messages requires an architecture solution that allows "legacy" Wi-Fi for IP-based networking and services to be supported concurrently with small messaging services. Current Wi-Fi architecture does not provide such a platform.

III. Example Conveyance of Communal Information

Figure 5:
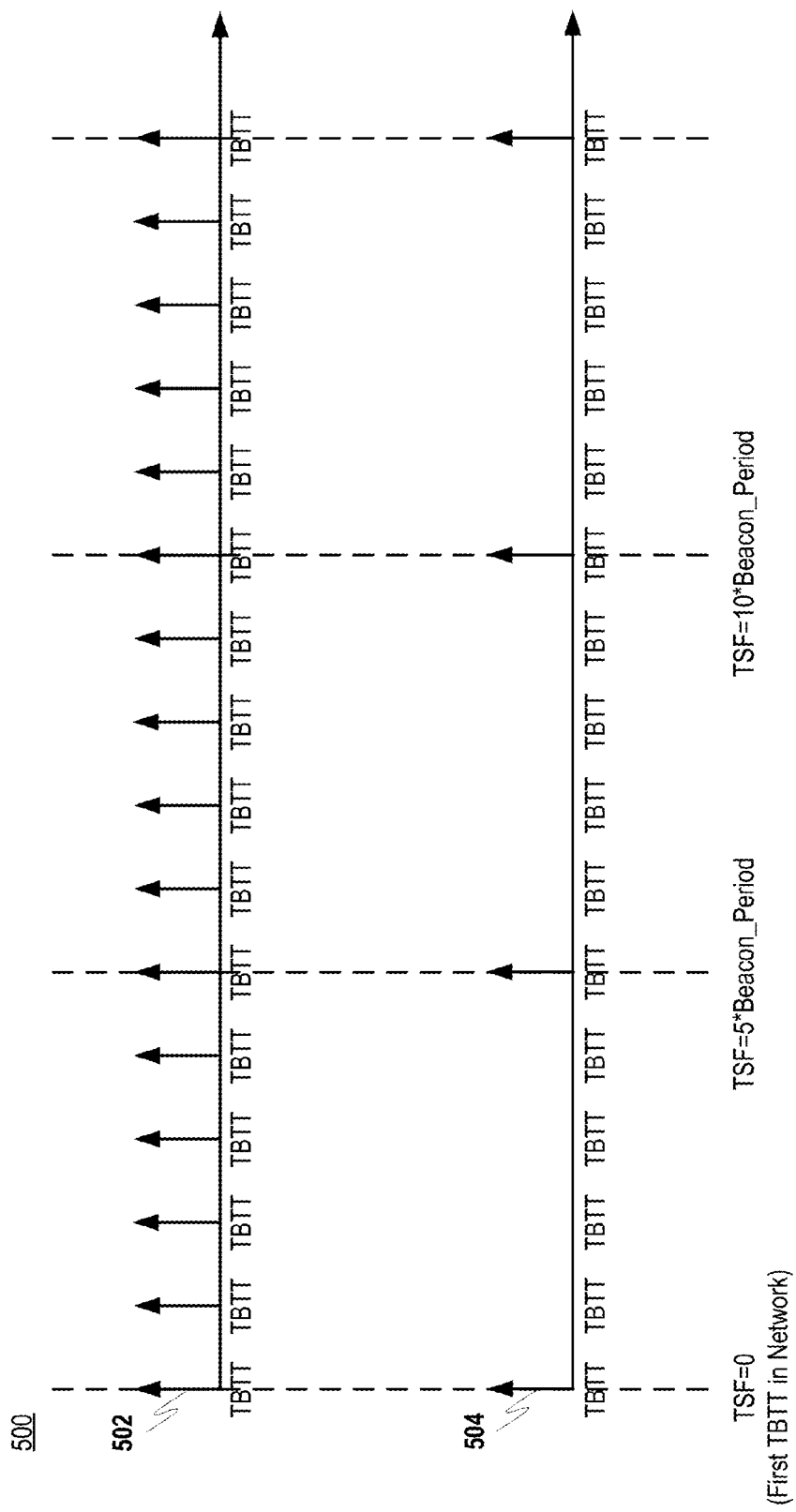
FIG. 5 discloses an example of message activity in accordance with at least one example embodiment of the present invention.

An example of network timing and beaconing usable in accordance with at least one embodiment of the present invention is disclosed in FIG. 5. The activity flow disclosed at 500 represents an example implementation using selected features of wireless local area networking (WLAN) as set forth in the IEEE 802.11 specification. However, the various embodiments of the present invention are not limited to implementation using WLAN, and thus, may be applied to other wireless network architectures employing different wireless mediums.

The WLAN logical architecture comprises stations (STA), wireless access points (AP), independent basic service sets (IBSS), basic service sets (BSS), distribution systems (DS), and extended service sets (ESS). Some of these components map directly to hardware devices, such as stations and wireless access points. For example wireless APs may function as bridges between stations and a network backbone (e.g., in order to provide network access). An IBSS is a wireless network comprising at least two STAs, and is also sometimes referred to as an ad hoc wireless network. A BSS is a wireless network comprising a wireless access point supporting one or multiple wireless clients, and is also sometimes referred to as an infrastructure wireless network. All STAs in a basic service set may interact via the AP. APs may provide connectivity to wired local area networks and bridging functionality when one STA initiates communication to another STA or with a node that is part of a distribution system (e.g., with a STA coupled to another AP that is linked through a wired network backbone).

In wireless network architectures like WLAN, beacon signals may be utilized to synchronize the operation of networked apparatuses such as disclosed above. In situations where new ad hoc networks are being created the initiating apparatus may establish beaconing based on its own clock, and all apparatuses that subsequently join the network may conform to the beacon. Similarly, apparatuses joining established networks may synchronize to the network beacon. In WLAN apparatuses may synchronize to beacon signals using a timing synchronization function (TSF), which is a local clock function that synchronizes to and tracks the network beacon period.

An example of a beacon signal is shown in FIG. 5 at 502 wherein a target beacon transmission time (TBTT) indicates the targeted beacon transmission. This time may be deemed "targeted" because the actual beacon transmission may be a somewhat delayed from the TBTT due to, for example, the channel being occupied at TBTT. The apparatuses that are active in the network may communicate with each other in accordance with the beacon period. However, there may be instances where it may not be beneficial, and may possibly even be detrimental, for apparatuses to be active during each beacon period. For example, apparatuses that do not expect frequent communication within the wireless network may not benefit from being active for every beacon period. Moreover, apparatuses with limited power or processing resource may be forced to waste these precious resources by the requirement of being active for every beacon period.

In accordance with at least one embodiment of the present invention, functionality may be introduced utilizing the example distributed wireless network described above to allow apparatuses to operate at a standard beaconing rate, or alternatively, using a "diluted" beaconing rate. "Diluted" beaconing may entail a beaconing mode operating at a lower frequency than the beaconing rate originally established in the network. Diluted beaconing may be controlled by information (e.g., information elements) that is included in network beacon frames, wherein the included information may express one or more diluted beacon rates as multiples of the beacon. Using the beacon and the one or more associated diluted beacon period indications contained within beacon frames, networked apparatuses may elect to operate (e.g., via random contention) based either on the beacon period or a diluted beacon period. In particular, all apparatuses may synchronize to the same initial target beacon transmission time (TBTT), for example when TSF=0, and may then count the number periods that occur after the initial TBTT based on the internal TSF function. In this way, apparatuses operating using a diluted beacon period may be active on TBTT counts that corresponds to the multiple defined by the diluted beaconing period.

An example diluted beacon rate of every $5^{th}$ TBTT is disclosed in FIG. 5 at 504. The decision on a beaconing rate to utilize may be handled by each apparatus individually, (e.g., in the protocol stacks that manage operation of a radio modem). All apparatuses, however, will operate based on a beacon interval that remains the same for the lifetime of the network. In view of the requirement that the beacon interval remain unchanged for the duration of the wireless network, the diluted beacon signal may be expressed as a multiple of the beacon signal. In the example disclosed in FIG. 5, and as set forth above, the first TBTT is equivalent TSF=0. This initial value is dictated by the apparatus that formed the network. Other apparatuses that subsequently join the network may adopt this beacon interval parameter and TBTT timing. For example, the TBTT at TSF=0 is the "base point" that determines when beacons are transmitted. All apparatuses in the network update their own TSF counters per legacy synchronization rules, and from the TSF they may determine the particular TBTT in which to participate in beaconing assuming that, regardless of the beaconing rate, the first beacon was transmitted at TSF=0.

For example, all apparatuses may remain synchronized in a network comprising four apparatuses wherein apparatuses 1, 2 and 4 operate using a diluted beaconing mode having an example frequency (e.g., a time period between beacon transmissions) of every 6$^{th}$ TBTT, but only device 3 would be active (e.g., "competing") in beaconing periods 1, 2, 3, 4 and 5, while all apparatuses may participate in TBTT 0, TBTT 6, TBTT 12, etc. Therefore, there can be at least two different beacon periods among the apparatuses, and possibly further diluted beacon periods, as each apparatus may select its own diluted beaconing period based on the original beaconing period and the one or more associated diluted beacon period indications transmitted therewith.

In accordance with at least one example embodiment of the present invention, beacons may contain a diluted beacon period parameter. For example, the diluted beacon period parameter may be carried in a vendor-specific Information Elements (IE) within a beacon packet. Diluted beacon period parameters remain the same for the lifetime of the network, however should there be need for more flexibility, other beacon rate periods may be predefined, and the predefined beacon rate periods may signaled in a manner similar to the diluted beaconing rate.

IV. Examples of Awake Windows

Figure 6:
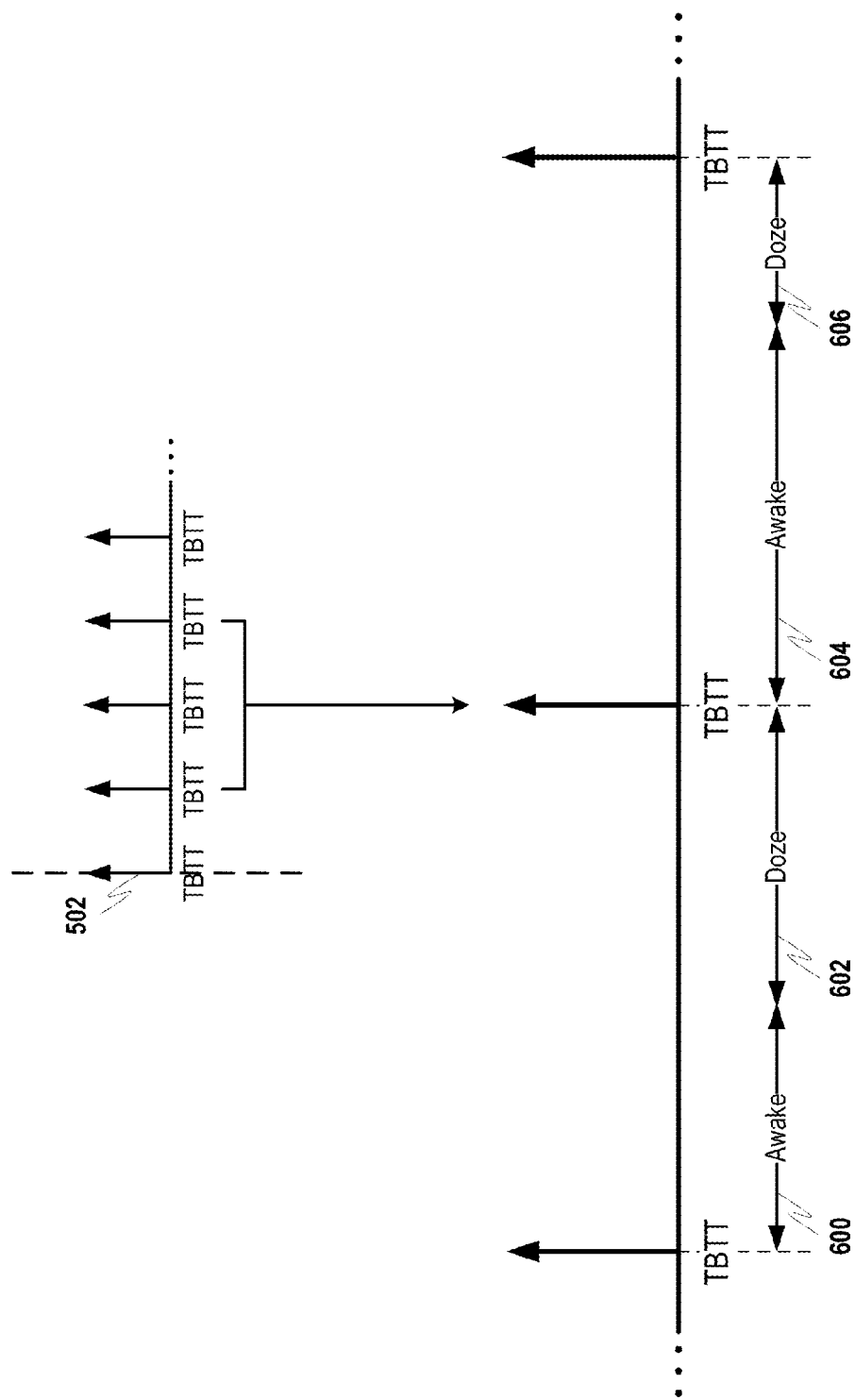
FIG. 6 discloses a further example of the message activity disclosed in FIG. 5 in accordance with at least one embodiment of the present invention.

FIG. 6 discloses an example implementation of "awake windows" in accordance with at least one embodiment of the present invention. Similar to FIG. 5, a "standard" network beacon (e.g., the beacon established by the apparatus that formed the network) is shown at 502. each target beacon transmit time (TBTT) may represent a beacon frame that is transmitted by an apparatus in the network (or at least times at which beacon transmissions were targeted, barring any delays). Thus, the interval shown at 502 may therefore define the standard beacon period.

Possible awake windows for an apparatus that is participating in the network are further shown in FIG. 6, examples of which are identified at 600 and 604. These active periods occur in accordance with each transmitted TBTT, and therefore, may be deemed aligned with the normal network beacon period. Awake windows do not necessarily represent that an apparatus has planned activity (e.g., messages queued for transmission) during these time periods. On the contrary, they are merely periods of time when apparatuses will be in active, and therefore, will be able to transmit messages to, and/or receive messages from, other apparatuses in the network.

While all apparatuses in the network will operate based on the same origin point (e.g., TSF=0) and normal beacon period (e.g., as set forth by the TBTT), individual apparatuses may select an operational mode based upon the one or more diluted beacon period indications that are transmitted in the beacon. For example, an apparatus may operate utilizing a diluted beacon period which is a multiple "4," and thus, may be allowed to be active every four TBTTs. Awake windows may also occur in accordance with a diluted beacon period, and in at least one example implementation, the awake windows may began just prior to the commencement of the diluted beacon period.

Awake window duration, while initially configured to be constant as defined by an IE carried by the beacon, may in actual practice be variable. For example, awake window duration may be defined by a MAC parameter similar to the beacon interval and diluted beacon period parameters. A host in the beaconing apparatus may determine awake window duration and provide it to the modem for transmission in the beacon. It may then be communicated using a general or vendor specific IE along with the beacon interval and diluted beacon period. Upon awake window expiration apparatuses may attempt to transition to a "doze" or sleep state as shown at 602 and 606. However, the transition to doze state may, in actuality, happen earlier or later in accordance with control methodologies that will be discussed with respect to FIG. 7-8.

In the awake state an apparatus is allowed to receive and transmit frames in the channel. An awake window length or duration MAC parameter may determine the final time after which the apparatus may sleep (at least in regard to communal messaging). However, a radio modem may alter operation locally if it detects certain situations. Examples of situations where a radio modem may alter operation are shown in FIG. 7-8. For example, if a radio modem in the awake state detects that there are no frames to be received, then the modem may enter the doze state early. In the "SHORTEN AWAKE PERIOD" example of FIG. 7 some message traffic 702 may occur during awake window 700 having an initial awake window duration 704. However, the radio modem may realize that no further messages 702 will be received, and may shorten the awake window duration 704 as shown at 706. As a result, the apparatus may enter the doze state more quickly and realize the benefits associated therewith (e.g., power savings).

An example entitled "AWAKE PERIOD CUTOFF PREVENTION" is further disclosed in FIG. 7. If continuous non-communal (e.g., external, such as from other networks) traffic prevents the modem from transitioning to the doze state the awake window expiration will finally force the modem to go into the doze state. However, if the awake window is scheduled to expire during reception of a communal information frame, then the modem may continue reception of the frame and after completion then enters into the doze state even if there were more frames to be received. This is shown at 710 wherein reception continues of frame 710 even after awake window 700 should have terminated (e.g., as shown by reception continuing after awake window duration cutoff 708), but the following communal information packets 712 are not received.

When the wireless channel is dominated by communal information traffic, awake window control is not as important because the radio modem may be active for the time required to receive all of the communal information frames. The main purpose for controlling the awake window length parameter in this case is to prevent the communal information traffic from being accidentally cut off by an awake window that is too short. An example of this scenario is disclosed under the heading "AWAKE PERIOD TOO SHORT" in FIG. 8. In the disclosed example awake window 700 has a duration that terminates as shown at 800. A first message 702 may be received during awake window 700, but other communal information messages received in the TBTT starting at 802 will not be received. While awake window 700 in this example is very short, and thus some power savings may be realized in the apparatus, the negative impact on performance due to the communal information messages starting at 802 not being received may outweigh any benefits.

However, problems may arise in situations where there is a significant amount of external traffic (e.g., non-communal information traffic from other networks) that may propagate interference on the wireless channel. In these instances proper adjustment of the awake window duration parameter may save power. To have a real low-energy, always-on, system, proper awake window length adjustment may minimize the receiver on-time when the channel becomes dominated by non-communal traffic. For example, if the awake window duration parameter value is too large and there is external traffic, the radio modem may stay in the awake state for too long, needlessly consuming apparatus power by receiving non-communal information frames. This sort of operational situation is disclosed under the heading "AWAKE WINDOW TOO LONG" in FIG. 8. In this example awake window 700 has a length or duration that ends at 804. There is some communal message traffic 702, but it does not carry on through the entire duration 804. As a result, the radio modem stays active and is able to receive other network traffic 806 that is not communal information and wastes resources in the apparatus.

In accordance with at least one embodiment of the present invention, it may be advantageous if apparatuses exchanging communal information could execute an adjustment algorithm for modifying awake window duration autonomously without the need for explicit control signaling between apparatuses. Avoiding dedicated control signaling for this purpose may help to conserve power. While automated adjustment may be beneficial, the adjustment must be done accurately. If awake windows do not have the appropriate duration, neighboring nodes may have very different parameter values, which may cause sleep-induced loss (e.g., communal information frames may be lost due to a modem dozing prematurely) because some devices will transmit communal information frames when others have already transitioned into the doze state.

Controlling ATIM (Announcement Traffic Indication Message) window duration may be deemed a somewhat similar concept to awake window duration. Current strategies focus only on the adjustment of the ATIM window in such a way that it is long enough for the desired ATIM traffic (coming from own network), without solving the problem of how to react properly to a situation where external traffic dominates the channel. Moreover, existing systems assume that ATIM window duration is signaled to neighboring apparatuses. In accordance with various embodiments of the present invention, this is a practice that should be avoided to conserve energy in the apparatus.

In accordance with at least one embodiment of the present invention, processes for autonomous awake window duration setting is disclosed. The disclosed embodiments may be used in an ad-hoc communal network (referred as "own" network) that competes for resources (e.g., wireless channel access) with other radio systems, also referred as "other" networks, that operate in same wireless bandwidth. Awake time duration or length may be set by measuring own network and other network traffic (e.g., as measured by own network apparatuses) so that if other network traffic becomes dominant in a wireless channel, own network devices may shorten their awake time durations. As a result, own network apparatuses may save energy because they avoid receiving other network traffic (e.g., every received other network packet is wasted energy for own network apparatuses). On the contrary, in a wireless channel where other network traffic is low, awake window duration may grow. If operating on multiple wireless channels, own network traffic may automatically be moved by awake window adjustments from wireless channels congested by other network traffic to less congested wireless channels, possibly resulting in energy savings and increased communication performance due to less interference.

While there may be some similarities between ATIM window length management and various embodiments of the present invention, as disclosed herein, there are also substantial differences. ATIM window control is based on pending traffic that a node is going to send to a counterpart node point-to-point. The various embodiments of the present invention may select awake window length based on at least two categories: own network traffic and other network traffic. ATIM window length is selected so that the pending traffic fits into the window, while in the various embodiments of the present invention the awake window length may be variable in order to accommodate communal information while screening out other network traffic. ATIM window length control is based only on present traffic, while in the various embodiments of the present invention adjustment may be based on predicted future traffic situations. ATIM window length is signaled to a counterpart node, while in various embodiments of the present invention awake window duration is controlled autonomously at each node, which helps to save power.

In accordance with at least one embodiment of the present invention, a channel utilization measure ($\hat{u}$) corresponding to transmitted and received network traffic/awake time, or to another similar channel congestion measure, may be utilized to predict own network traffic and other network traffic. Utilization $\hat{u}$ may be formulated by a radio modem supporting communal messaging, or it may be calculated in upper layers of the apparatus communication system based on received packets and information obtained about measured awake time. Utilization $\hat{u}$ can be instantaneous per awake-period or buffered previous utilizations from where average, median or moving average may be calculated. Instant channel utilizations $u_k, u_{k+1}, \ldots, u_{k+n}$ may collected to a buffer vector of size n, and when the buffer is full:

Alternative 1: Average: $\hat{u}$=Mean $(u_{k, uk+1}, \ldots, u_{k+n})$
Alternative 2: Median: $\hat{u}$=Median $(u_{k, uk+1}, \ldots, u_{k+n})$
Alternative 3: Exponential moving average: $\hat{u}=(1-\alpha)\hat{u}_{k-1}\alpha u_k$ wherein $0<\alpha<1$; for example, $\alpha$ may be set to $\alpha=1/((n-1)/2)$.

Following are example algorithms for adjusting awake window duration that may use the variables: awakeTime—Time the modem was awake per awake window; $\hat{u}_{other}$—other Received other networks' traffic per awake time; $\hat{u}_{own}$—Transmitted and received own networks' traffic per awake time; Dominance_Threshold_other—Threshold that determines others' dominance, for example 50%; Dominance_Threshold_own—Threshold that determines own dominance, for example 50%; $w_{step}$—Amount of decrease in awake window length when shortened; $v_{step}$—Amount of increase in awake window length when grown; CurrentAwakeWindowLength—Length of awake window now; MaxAwakeWindowLength—Widest possible awake window; MinAwakeWindowLength—Shortest possible awake window; NextAwakeWindowLength—Result of the algorithm. In accordance with at least one embodiment of the present invention, two example pseudocodes that help explain how awake window duration may be adjusted comprise:

Example Alternative 1: Fixed Thresholds for Dominance

```
Function Adjust_AwakeWindowLength
{
If ($\hat{u}_{other}$ > Dominance_Threshold_other)
    // Shorten
    NextAwakeWindowLength := Max {CurrentAwakeWindowLength – w_step, MinAwakeWindowLength}
ElseIf ($\hat{u}_{own}$ > Dominance_Threshold_own)
    // Grow
    NextAwakeWindowLength := Min {CurrentAwakeWindowLength + v_step, MaxAwakeWindowLength}
Else
    // Keep
    NextAwakeWindowLength := CurrentAwakeWindowLength
EndIf
}
```

Example Alternative 2: Differential Comparison

```
Function Adjust_AwakeWindowLength
{
   If ( û_other > previous û_other )
      // Shorten
      NextAwakeWindowLength := Max {CurrentAwakeWindowLength -
      w_step, MinAwakeWindowLength}
   ElseIf ( û_own > previous û_own )
      // Grow
      NextAwakeWindowLength := Min {CurrentAwakeWindowLength +
      v_step, MaxAwakeWindowLength}
   Else
      // Keep
      NextAwakeWindowLength := CurrentAwakeWindowLength
   EndIf
}
```

In addition, the awakeTime variable can be used to boost the algorithm using the comparison: CurrentAwakeWindowLength<=awakeTime, which may represent whether awake window duration has been "cut," wherein the previous awake window ended prematurely during an ongoing transmission of own network traffic (see, for example, FIG. 7 "AWAKE CUTOFF PREVENTION"). For example, if the awake window was determined to be cut, and the other network traffic is not dominating the wireless channel, awake-window duration may be grown more aggressively than in the above algorithm using, for example, the growth pseudocode: NextAwakeWindowLength:=Min {CurrentAwakeWindowLength+$v_{step}$+1, MaxAwakeWindowLength}

An advantage realized by using awake window length control algorithms instead of having a fixed awake window length is that a system (e.g., communal information distribution system) may operate in an always-on fashion while still having reasonable power consumption. Moreover, scalability may be introduced into power consumption in that that power consumption for each apparatus in a community may be controlled locally regardless of the community size (e.g., the same algorithm may be used regardless of community size since the control is localized and inter-apparatus notification is not required). In accordance with at least one embodiment of the present invention, awake window duration control may be implemented with no changes in the radio modem, and if needed, may instead be implemented in the host (e.g., control layers in the apparatus). In multi-channel operation, awake window duration may be different for each wireless channel, allowing traffic to be directed to non-congested channels if necessary.

Figure 9A:
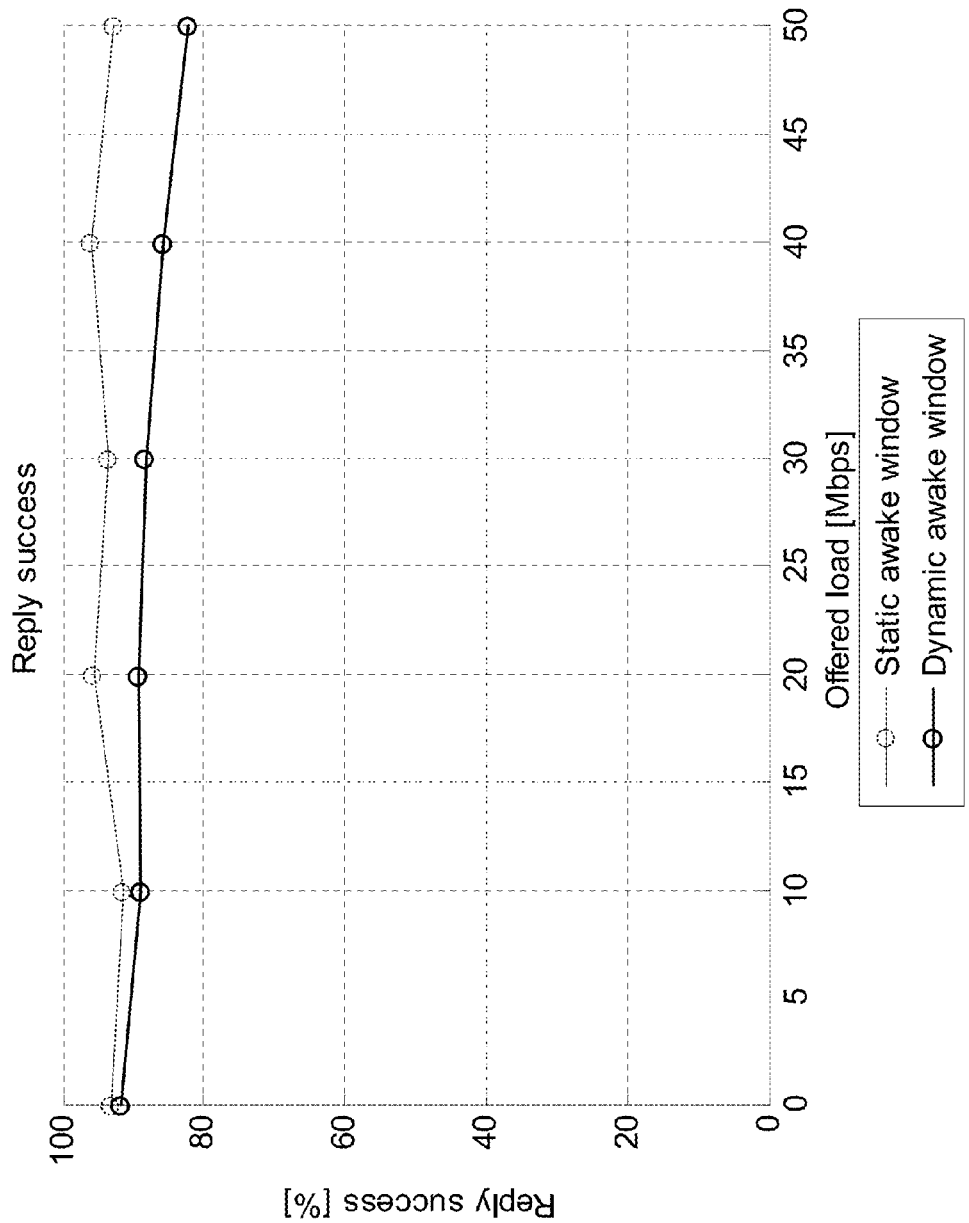
FIG. 9A discloses an example simulation of performance that may be realized in accordance with at least one example embodiment of the present invention.
Figure 9B:
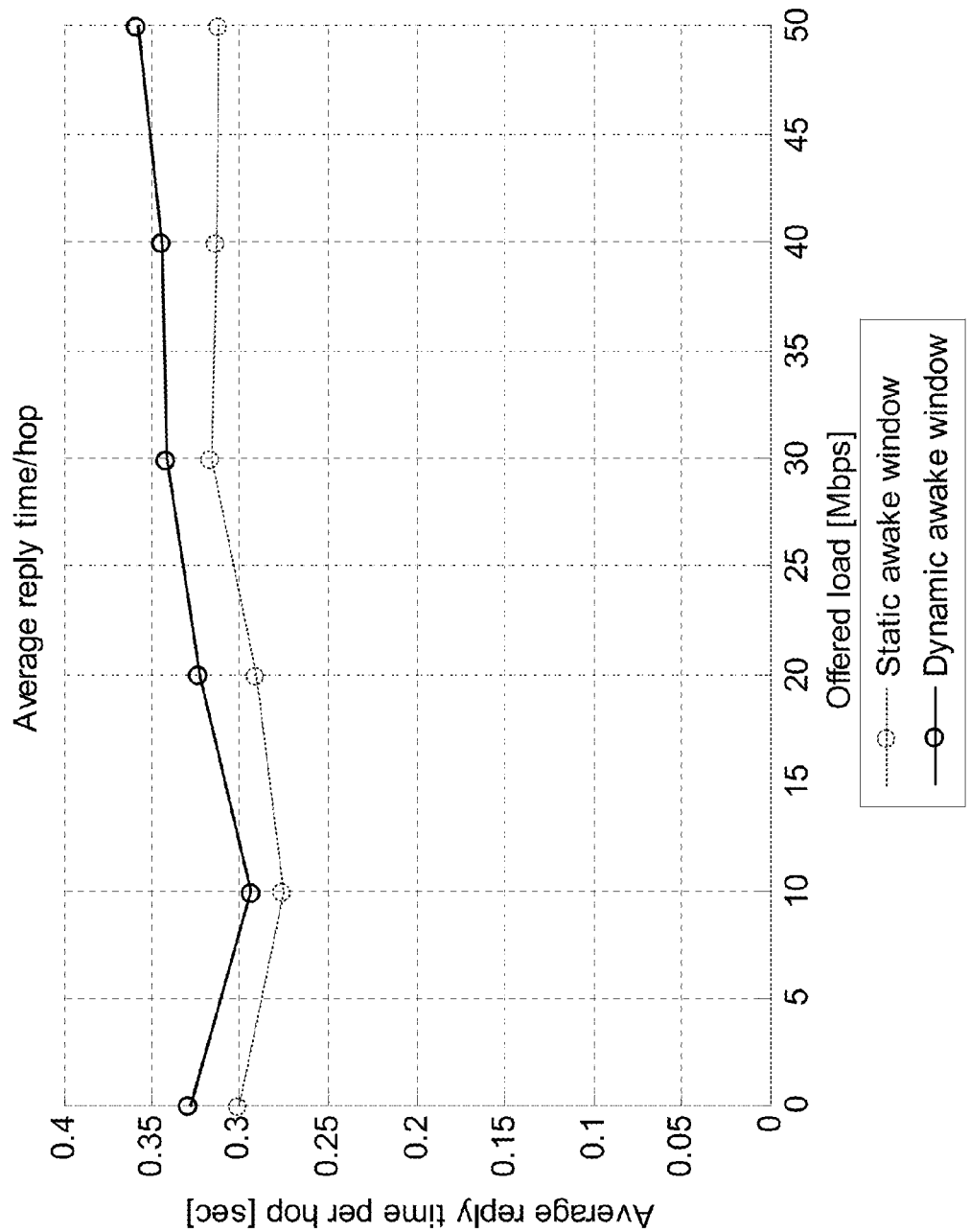
FIG. 9B discloses a second example simulation of performance that may be realized in accordance with at least one example embodiment of the present invention.

FIG. 9A-9C disclose simulation results based on an operational scenario including 200 apparatuses in a community randomly distributed over 400 m×50 m area. Different devices executed different operations, like searching members of the community (multi-hop), exchanging context information (single hop), publishing of profile information (multi-hop), group chat using community messaging (multi-hop) and matching of interest tags (multi-hop). There were also varying number of non-community apparatuses providing additional background traffic. Other network traffic is presented as offered load over the whole simulation area. Two different cases are presented: Static awake window operation, where awake window duration is a fixed value; and Dynamic awake window operation, where awake window duration is dynamically adjusted.

FIG. 9A discloses an example effect of awake window duration adjustment on reply success (e.g., the percent of responses to different queries reached back the queried device). When the amount of other network traffic grows on the wireless channel the reply loss appears to increase slightly. FIG. 9B discloses an example effect of awake window duration adjustment on reply times. The time-per-hop appears to increase slightly when awake window duration adjustment is used. FIG. 9C discloses an example effect of awake window duration adjustment on power consumption. When the amount of other network traffic grows the system using awake window duration adjustment appears to put the radio modem into the doze state earlier, resulting in fewer other network frames being received and substantially lower power consumption.

Figure 10A:
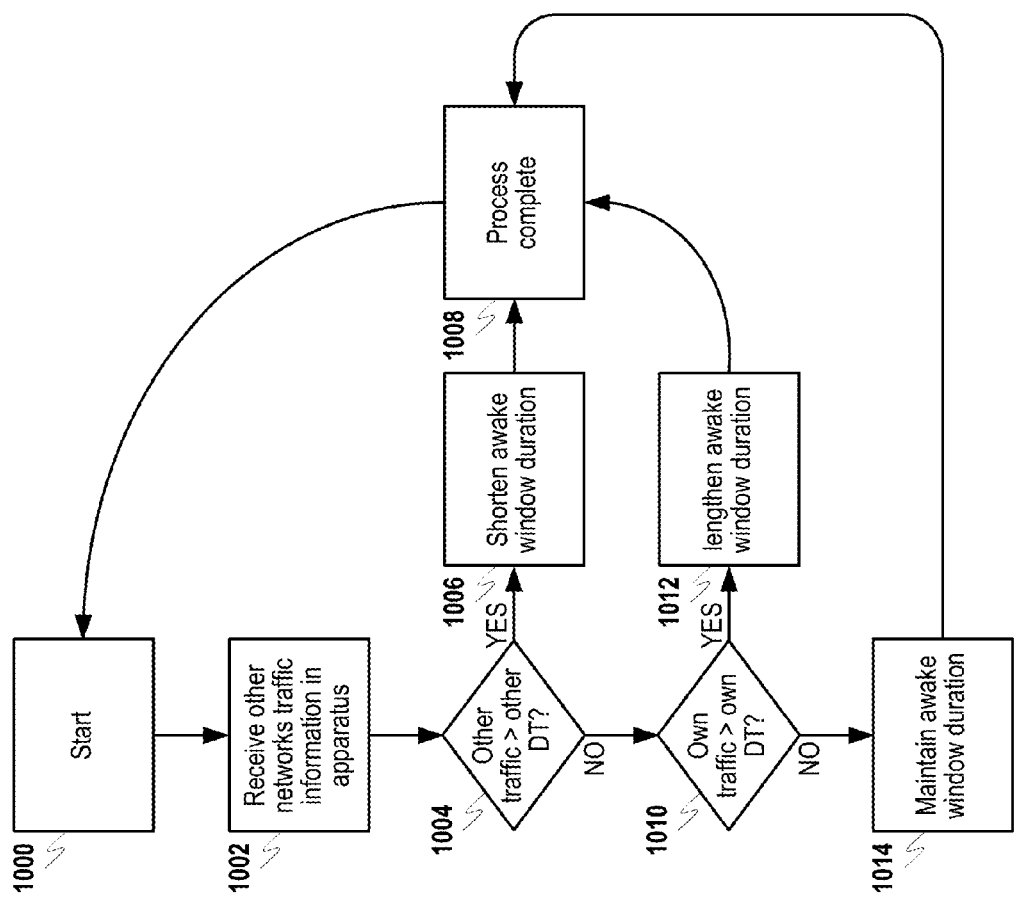
FIG. 10A discloses a flowchart for an example communication control process in accordance with at least one example embodiment of the present invention.

In accordance with at least one embodiment of the present invention, an example flowchart of a communication process is disclosed in FIG. 10A. The process may initiate in step 1000, which is followed by step 1002 wherein first information (e.g., other network traffic expected on a wireless channel) may be received in an apparatus. A determination may then be made in step 1004 as to whether the first information (e.g., the expected other network traffic information) satisfies a first criterion (e.g., will exceed the other network's dominance threshold (DT) value). The other network dominance threshold may be set in the apparatus as a fixed value or may be a dynamic value that may be updated by the apparatus periodically based, for example, on average other network traffic on the wireless channel, based on changes sensed in wireless channel traffic, etc. If it is determined in step 1004 that the expected other network channel traffic exceeds the other network DT, the process may proceed to step 1006 wherein the awake window duration may be shortened (e.g., to avoid receiving other network messages and conserve apparatus power), but not below an awake window minimum value set in the apparatus. The process may then be complete in step 1008 and may return to step 1000 in preparation for the next reception of other network traffic information in step 1002.

If in step 1004 it is determined that the expected other network traffic will not exceed the other network DT, a further determination may be made in step 1010 as to whether second information (e.g., expected own network traffic on the wireless channel, such as traffic from a network in which the apparatus is participating) will satisfy a second criterion (e.g., will exceed an own network DT). Own network information may be received in the apparatus from other apparatuses in the own network (e.g., via communal messaging) or may already be present in the apparatus based on the participation of the apparatus in the own network. Like the other network DT, the own network DT may be set in the apparatus as fixed or dynamic value that may be updated by the apparatus periodically based on, for example, average own network traffic on the wireless channel, sensed changes in own network traffic on the wireless channel or in the apparatus itself due to, for example, the activation of a particular application on the apparatus (e.g., a chat application), a power condition in the apparatus, etc. If in step 1010 it is determined that expected own network traffic will exceed the own network DT, the process may then move to step 1012 where the awake window duration may be lengthened (e.g., in order to provide more time for own network operation), but not above a maximum value set in the apparatus. The process may then terminate in step 1008 and reinitiate in step 1000. If in step 1010 it is determined that predicted own network traffic will not exceed the own network DT, the process may move to step 1014 where the awake window duration may be maintained (e.g., not changed from previous length). The process may then terminate in step 1008 and reinitiate in step 1000.

Figure 10B:
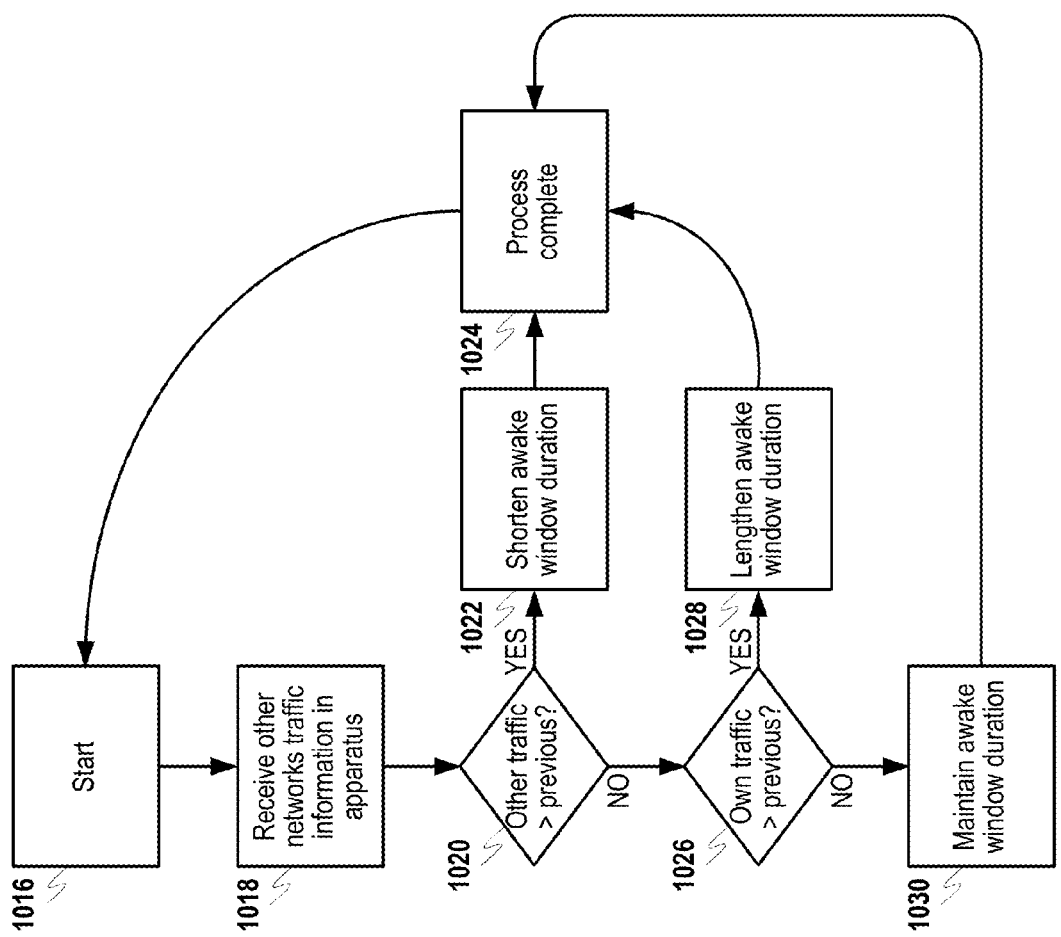
FIG. 10B discloses a second flowchart for an second example communication control process in accordance with at least one example embodiment of the present invention.

An alternative example communication process, in accordance with at least one embodiment of the present invention, is disclosed in FIG. 10B. The process may initiate in step 1016 and may receive other network traffic information expected for a wireless channel similar to the process of FIG. 10A. However, in step 1020 a determination may be made as to whether the first information (e.g., expected other network traffic on the wireless channel) satisfies a different first criterion (e.g., a previous value for expected other network traffic on the wireless channel). The previous value for the other network traffic information may be the last set of other network traffic information received by the apparatus. If in step 1020 it is determined that the expected other network traffic information exceeds the previous other network traffic information (e.g., other network traffic appears to be increasing), the process may move to step 1022 wherein the awake window duration may be shortened to avoid receiving other network traffic (e.g., to save power). Similar to FIG. 10A, a minimum value set in the apparatus may prevent the awake window duration from becoming too short. The process may then terminate in step 1024 and may return to step 1016 in preparation for the next reception of other network traffic information in step 1018.

If in step 1020 a determination is made that the first information does not satisfy the first criterion, the process may proceed to step 1026 wherein a further determination may be made as to whether second information (e.g., own network traffic expected on the wireless channel) satisfies a second criterion (exceeds previous own network traffic information). If it is determined in step 1026 that the expected own network traffic information exceeds the previous own network traffic information (e.g., own network traffic appears to be increasing), the process may move to step 1028 wherein the awake window duration may be lengthened (e.g., in order to avoid packet losses due to awake window cutoff). Similar to FIG. 10A, a maximum value set in the apparatus may prevent the awake window duration from becoming too long. The process may then be complete in 1024 and may reinitiate in step 1016. Otherwise, if in step 1026 it is determined that the second information does not satisfy the second criterion (e.g. the expected own network traffic does not exceed the previous own network traffic), the process may move to step 1030 wherein the awake window duration may be maintained (e.g., awake window duration is not altered). The process may then be complete in step 1024 and may reinitiate in step 1016.

Further to the above, the various example embodiments of the present invention are not strictly limited to the above implementations, and thus, other configurations are possible.

For example, an apparatus, in accordance with at least one embodiment of the present invention, may comprise means for receiving information pertaining to wireless traffic expected from other networks utilizing a wireless channel on which the apparatus is configured to communicate, means for determining whether the first information satisfies a first criterion, means for, if the first information is determined to satisfy the first criterion, shortening an awake window duration for communicating on the wireless channel, means for, if the first information is determined not to satisfy the first criterion, determining whether second information satisfies a second criterion, the second information pertaining to wireless traffic on the wireless channel that is expected from a network in which the apparatus is participating, and means for if the second information is determined to satisfy the second criterion, lengthening the awake window duration for communicating on the wireless channel.

At least one other example embodiment of the present invention may include electronic signals that cause an apparatus receive information pertaining to wireless traffic expected from other networks utilizing a wireless channel on which the apparatus is configured to communicate, determine whether the information satisfies a first criterion, if the information is determined to satisfy the first criterion, shorten an awake window duration for communicating on the wireless channel, if the first information is determined not to satisfy the first criterion, determine whether second information satisfies a second criterion, the second information pertaining to wireless traffic on the wireless channel that is expected from a network in which the apparatus is participating, and if the second information is determined to satisfy the second criterion, lengthen the awake window duration for communicating on the wireless channel.

Accordingly, it will be apparent to persons skilled in the relevant art that various changes in form a and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
   receiving first information in an apparatus configured to communicate on a wireless channel, the first information pertaining to wireless traffic expected from networks, other than a network in which the apparatus is participating, that are also utilizing the wireless channel;
   determining whether the first information satisfies a first criterion in the apparatus;
   if the first information is determined to satisfy the first criterion in the apparatus, shortening an awake window duration for communicating on the wireless channel;
   if the first information is determined not to satisfy the first criterion in the apparatus, determining whether second information satisfies a second criterion in the apparatus, the second information pertaining to wireless traffic on the wireless channel that is expected from the network in which the apparatus is participating; and
   if the second information is determined to satisfy the second criterion in the apparatus, lengthening the awake window duration for communicating on the wireless channel,
   wherein the first criterion is a dominance threshold value for the other networks also utilizing the wireless channel; and the second criterion is a dominance threshold value for the network in which the apparatus is participating;
   wherein determining whether the first information satisfies the first criterion in the apparatus comprises determining whether the wireless traffic expected from the other networks also utilizing the wireless channel exceeds the dominance threshold value for the other networks also utilizing the wireless channel; and
   wherein determining whether the second information satisfies the second criterion in the apparatus comprises determining whether the wireless traffic expected from the network in which the apparatus is participating exceeds the dominance threshold value for the network in which the apparatus is participating.

2. The method of claim 1, wherein the awake window corresponds to a period of time during which the apparatus is allowed to transmit and receive on the wireless channel.

3. The method of claim 1, further comprising, if the second information is determined not to satisfy the second criterion in the apparatus, maintaining the awake window duration for communicating on the wireless channel.

4. A computer program product comprising computer executable program code recorded on a non-transitory computer readable storage medium, the computer executable program code comprising:
- code configured to cause an apparatus configured to communicate on a wireless channel to receive first information pertaining to wireless traffic expected from networks, other than a network in which the apparatus is participating, that are also utilizing the wireless channel;
- code configured to cause the apparatus to determine whether the first information satisfies a first criterion;
- code configured to cause the apparatus to, if the first information is determined to satisfy the first criterion in the apparatus, shorten an awake window duration for communicating on the wireless channel;
- code configured to cause the apparatus to, if the first information is determined not to satisfy the first criterion, determine whether second information satisfies a second criterion in the apparatus, the second information pertaining to wireless traffic on the wireless channel that is expected from the network in which the apparatus is participating; and
- code configured to cause the apparatus to, if the second information is determined to satisfy the second criterion, lengthen the awake window duration for communicating on the wireless channel,
- wherein the first criterion is a dominance threshold value for the other networks also utilizing the wireless channel; and the second criterion is a dominance threshold value for the network in which the apparatus is participating;
- wherein the code configured to cause the apparatus to determine whether the first information satisfies the first criterion comprises code configured to cause the apparatus to determine whether the wireless traffic expected from the other networks also utilizing the wireless channel exceeds the dominance threshold value for the other networks also utilizing the wireless channel; and
- wherein the code configured to cause the apparatus to determine whether the second information satisfies the second criterion comprises code configured to cause the apparatus to determine whether the wireless traffic expected from the network in which the apparatus is participating exceeds the dominance threshold value for the network in which the apparatus is participating.

5. The computer program product of claim 4, wherein the awake window corresponds to a period of time during which the apparatus is allowed to transmit and receive on the wireless channel.

6. The computer program product of claim 4, further comprising code configured to cause the apparatus to, if the second information is determined not to satisfy the second criterion, maintain the awake window duration for communicating on the wireless channel.

7. An apparatus, comprising:
- at least one processor; and
- at least one memory including executable instructions, the at least one memory and the executable instructions being configured to, in cooperation with the at least one processor, cause the apparatus to perform at least the following:
  - receive first information pertaining to wireless traffic expected from networks, other than a network in which the apparatus is participating, that are utilizing a wireless channel on which the apparatus is configured to communicate;
  - determine whether the first information satisfies a first criterion;
  - if the first information is determined to satisfy the first criterion, shorten an awake window duration for communicating on the wireless channel;
  - if the first information is determined not to satisfy the first criterion, determine whether second information satisfies a second criterion, the second information pertaining to wireless traffic on the wireless channel that is expected from the network in which the apparatus is participating; and
  - if the second information is determined to satisfy the second criterion, lengthen the awake window duration for communicating on the wireless channel,
- wherein the first criterion is a dominance threshold value for the other networks also utilizing the wireless channel; and the second criterion is a dominance threshold value for the network in which the apparatus is participating;
- wherein the at least one memory and the executable instructions being configured to, in cooperation with the at least one processor, cause the apparatus to determine whether the first information satisfies the first criterion comprises the at least one memory and the executable instructions being configured to, in cooperation with the at least one processor, cause the apparatus to determine whether the wireless traffic expected from the other networks also utilizing the wireless channel exceeds the dominance threshold value for the other networks also utilizing the wireless channel; and
- wherein the at least one memory and the executable instructions being configured to, in cooperation with the at least one processor, cause the apparatus to determine whether the second information satisfies the second criterion comprises the at least one memory and the executable instructions being configured to, in cooperation with the at least one processor, cause the apparatus to determine whether the wireless traffic expected from the network in which the apparatus is participating exceeds the dominance threshold value for the network in which the apparatus is participating.

8. The apparatus of claim 7, wherein the awake window corresponds to a period of time during which the apparatus is allowed to transmit and receive on the wireless channel.

9. The apparatus of claim 7, further comprising the at least one memory and the executable instructions being configured to, in cooperation with the at least one processor, cause the apparatus to, if the second information is determined not to satisfy the second criterion in the apparatus, maintain the awake window duration for communicating on the wireless channel.

10. A system, comprising:
- an apparatus comprising at least one processor and at least one memory including executable instructions, the at least one memory and the executable instructions being configured to, in cooperation with the at least one processor, cause the apparatus to communicate on a wireless channel; and
- networks other than a network in which the apparatus is participating;
- the apparatus being configured to receive first information pertaining to wireless traffic expected from the other networks also utilizing the wireless channel;
- the apparatus further being configured to determine whether the first information satisfies a first criterion, and if the information is determined to satisfy the first criterion, to shorten an awake window duration for communicating on the wireless channel; and the apparatus further being configured to, if the first information is determined not to satisfy the first criterion, determine whether second information satisfies a second criterion, the second information pertaining to wireless traffic on the wireless channel that is expected from the network in which the apparatus is participating; and if the second information is determined to satisfy the second criterion, to lengthen the awake window duration for communicating on the wireless channel, wherein the first criterion is a dominance threshold value for the other networks also utilizing the wireless channel; and the second criterion is a dominance threshold value for the network in which the apparatus is participating;

wherein the apparatus further being configured to determine whether the first information satisfies the first criterion, comprises the apparatus being configured to determine whether the wireless traffic expected from the other networks also utilizing the wireless channel exceeds the dominance threshold value for the other networks also utilizing the wireless channel; and wherein the apparatus further being configured to determine whether the second information satisfies the second criterion, comprises the apparatus being configured to determine whether the wireless traffic expected from the network in which the apparatus is participating exceeds the dominance threshold value for the network in which the apparatus is participating.

11. A method, comprising:

receiving first information in an apparatus configured to communicate on a wireless channel, the first information pertaining to wireless traffic expected from networks, other than a network in which the apparatus is participating, that are also utilizing the wireless channel;

determining whether the first information satisfies a first criterion in the apparatus;

if the first information is determined to satisfy the first criterion in the apparatus, shortening an awake window duration for communicating on the wireless channel;

if the first information is determined not to satisfy the first criterion in the apparatus, determining whether second information satisfies a second criterion in the apparatus, the second information pertaining to wireless traffic on the wireless channel that is expected from the network in which the apparatus is participating; and if the second information is determined to satisfy the second criterion in the apparatus, lengthening the awake window duration for communicating on the wireless channel, wherein the first criterion is a previous occurrence of the first information; and the second criterion is a previous occurrence for the second information;

wherein determining whether the first information satisfies the first criterion in the apparatus comprises determining whether the wireless traffic expected from the other networks also utilizing the wireless channel exceeds a previous occurrence of wireless traffic expected from the other networks also utilizing the wireless channel; and wherein determining whether the second information satisfies the second criterion in the apparatus comprises determining whether the wireless traffic expected from the network in which the apparatus is participating exceeds a previous occurrence of wireless traffic expected from the network in which the apparatus is participating.

12. A computer program product comprising computer executable program code recorded on a non-transitory computer readable storage medium, the computer executable program code comprising:

code configured to cause an apparatus configured to communicate on a wireless channel to receive first information pertaining to wireless traffic expected from networks, other than a network in which the apparatus is participating, that are also utilizing the wireless channel;

code configured to cause the apparatus to determine whether the first information satisfies a first criterion;

code configured to cause the apparatus to, if the first information is determined to satisfy the first criterion in the apparatus, shorten an awake window duration for communicating on the wireless channel;

code configured to cause the apparatus to, if the first information is determined not to satisfy the first criterion, determine whether second information satisfies a second criterion in the apparatus, the second information pertaining to wireless traffic on the wireless channel that is expected from the network in which the apparatus is participating; and code configured to cause the apparatus to, if the second information is determined to satisfy the second criterion, lengthen the awake window duration for communicating on the wireless channel, wherein the first criterion is a previous occurrence of the first information; and the second criterion is a previous occurrence for the second information;

wherein the code configured to cause the apparatus to determine whether the first information satisfies the first criterion comprises code configured to cause the apparatus to determine whether the wireless traffic expected from the other networks also utilizing the wireless channel exceeds a previous occurrence of wireless traffic expected from the other networks also utilizing the wireless channel; and wherein the code configured to cause the apparatus to determine whether the second information satisfies the second criterion comprises code configured to cause the apparatus to determine whether the wireless traffic expected from the network in which the apparatus is participating exceeds a previous occurrence of wireless traffic expected from the network in which the apparatus is participating.

13. An apparatus, comprising:

at least one processor; and at least one memory including executable instructions, the at least one memory and the executable instructions being configured to, in cooperation with the at least one processor, cause the apparatus to perform at least the following:

receive first information pertaining to wireless traffic expected from networks, other than a network in which the apparatus is participating, that are utilizing a wireless channel on which the apparatus is configured to communicate;

determine whether the first information satisfies a first criterion;

if the first information is determined to satisfy the first criterion, shorten an awake window duration for communicating on the wireless channel;

if the first information is determined not to satisfy the first criterion, determine whether second information satisfies a second criterion, the second information pertaining to wireless traffic on the wireless channel that is expected from the network in which the apparatus is participating; and if the second information is determined to satisfy the second criterion, lengthen the awake window duration for communicating on the wireless channel, wherein the first criterion is a previous occurrence of the first information; and the second criterion is a previous occurrence for the second information;

wherein the at least one memory and the executable instructions being configured to, in cooperation with the at least one processor, cause the apparatus to determine whether the first information satisfies the first criterion comprises the at least one memory and the executable instructions being configured to, in cooperation with the at least one processor, cause the apparatus to determine whether the wireless traffic expected from the other networks also utilizing the wireless channel exceeds a previous occurrence of wireless traffic expected from the other networks also utilizing the wireless channel; and wherein the at least one memory and the executable instructions being configured to, in cooperation with the at least one processor, cause the apparatus to determine whether the second information satisfies the second criterion comprises the at least one memory and the executable instructions being configured to, in cooperation with the at least one processor, cause the apparatus to determine whether the wireless traffic expected from the network in which the apparatus is participating exceeds a previous occurrence of wireless traffic expected from the network in which the apparatus is participating.

* * * * *